United States Patent [19]
Urshan et al.

[11] Patent Number: 5,468,944
[45] Date of Patent: Nov. 21, 1995

[54] HIGH-SPEED OPTICAL RECORDING AND PLAYBACK APPARATUS CAPABLE OF RECORDING AND RETRIEVING DIGITAL DATA FROM AN OPTICAL STORAGE CARD

[76] Inventors: Sydney Urshan, 6830 Morella Ave., North Hollywood, Calif. 91605; Curtis K. Deckert, 18061 Darmel Pl., Santa Ana, Calif. 92705; Oscar Gonzales, 730 Nowita Pl., Venice, Calif. 90291

[21] Appl. No.: 77,095

[22] Filed: Jun. 16, 1993

[51] Int. Cl.⁶ .................................................... G06K 7/00
[52] U.S. Cl. .......................... 235/454; 235/479; 235/485
[58] Field of Search ................................. 235/488, 479, 235/483, 484, 485, 486, 454, 457, 456, 475

[56] References Cited

U.S. PATENT DOCUMENTS 5,008,552  4/1991  Kuramochi ............................. 235/483
5,059,774  10/1991  Kubo ..................................... 235/454
5,130,521  7/1992  Shino ..................................... 235/476

*Primary Examiner*—Davis L. Willis
*Assistant Examiner*—Karl D. Frech

[57] ABSTRACT

Apparatus consisting of a flat, two-dimensional array of laser/photo diodes; an optical storage card positioned below the array; and a mechanism to move the card in both the X- and Y-directions to position the laser/photo diode array over any one particular location on the card. A further mechanism serves to move the card in the X- and Y-directions and angularly to provide an initial alignment of the card with respect to the laser/photo diode array. Yet another mechanism moves the card in the Z-direction for focusing purposes. A laser/optical interface positioned between the laser/photo diode array and the card which is formed of an array of collimating and focusing holographic micro lenses (HOE) with surface diffraction patterns. An electronic section functions as an interface between a central processing unit (CPU) and the lasers and photo diodes of the array. The optical storage card is a thin, re-writable phase-change type.

14 Claims, 26 Drawing Sheets

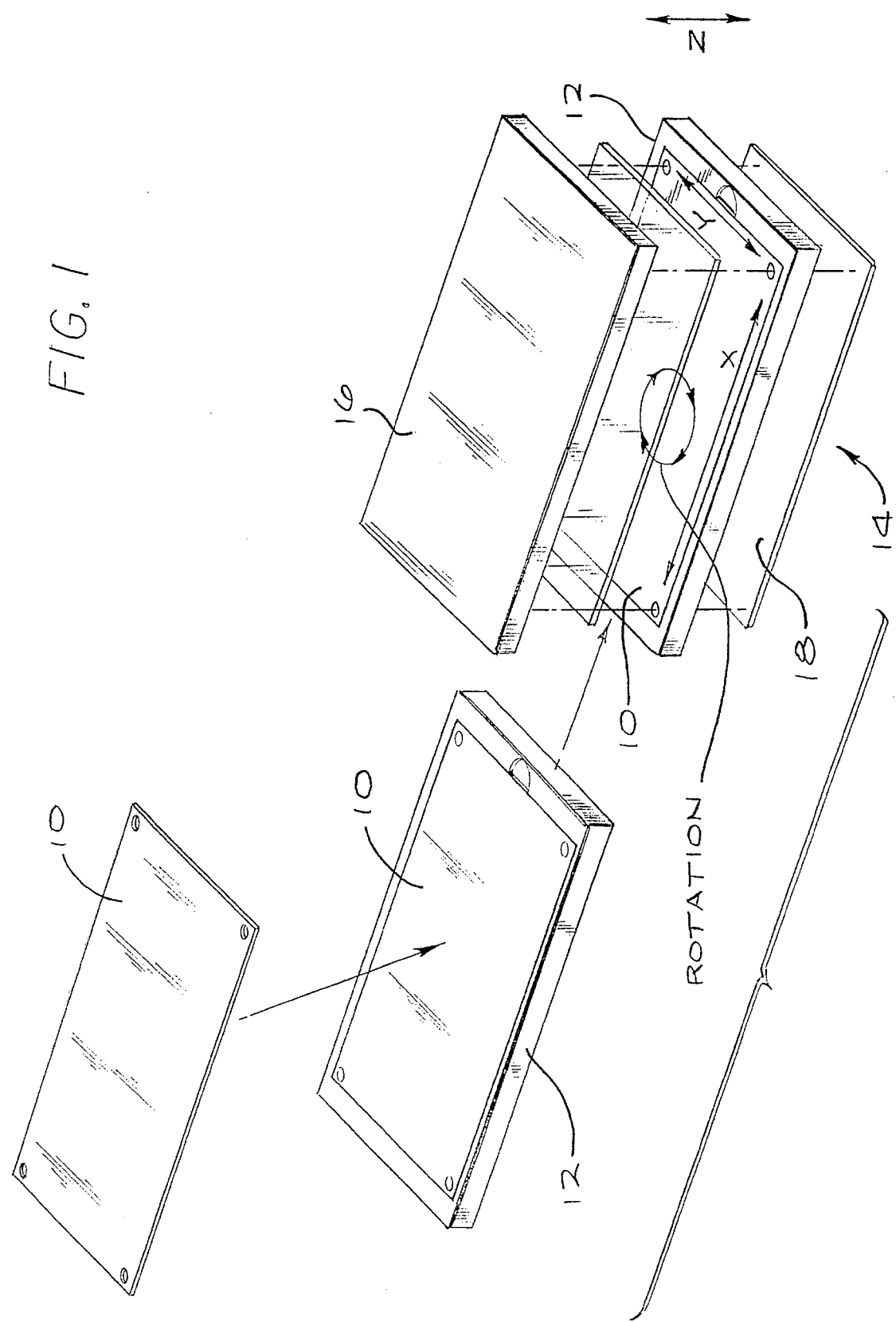

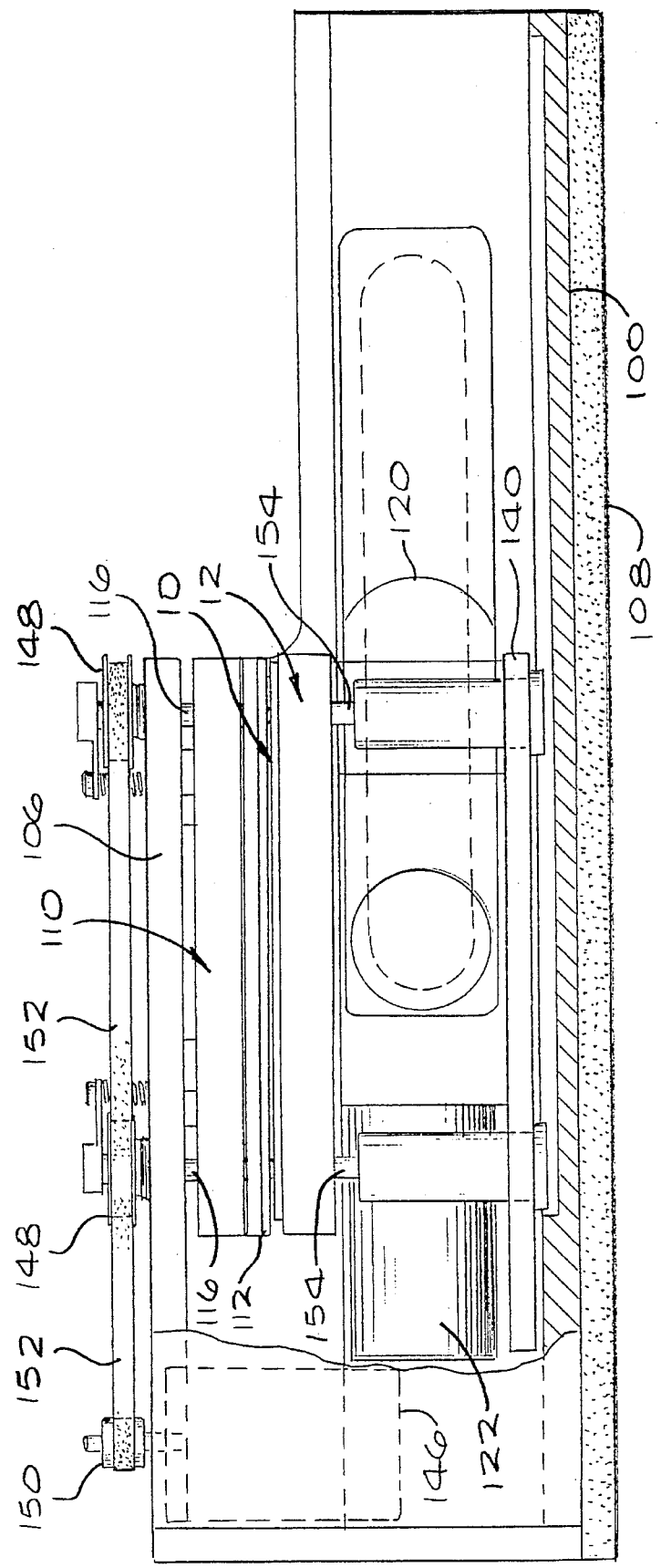

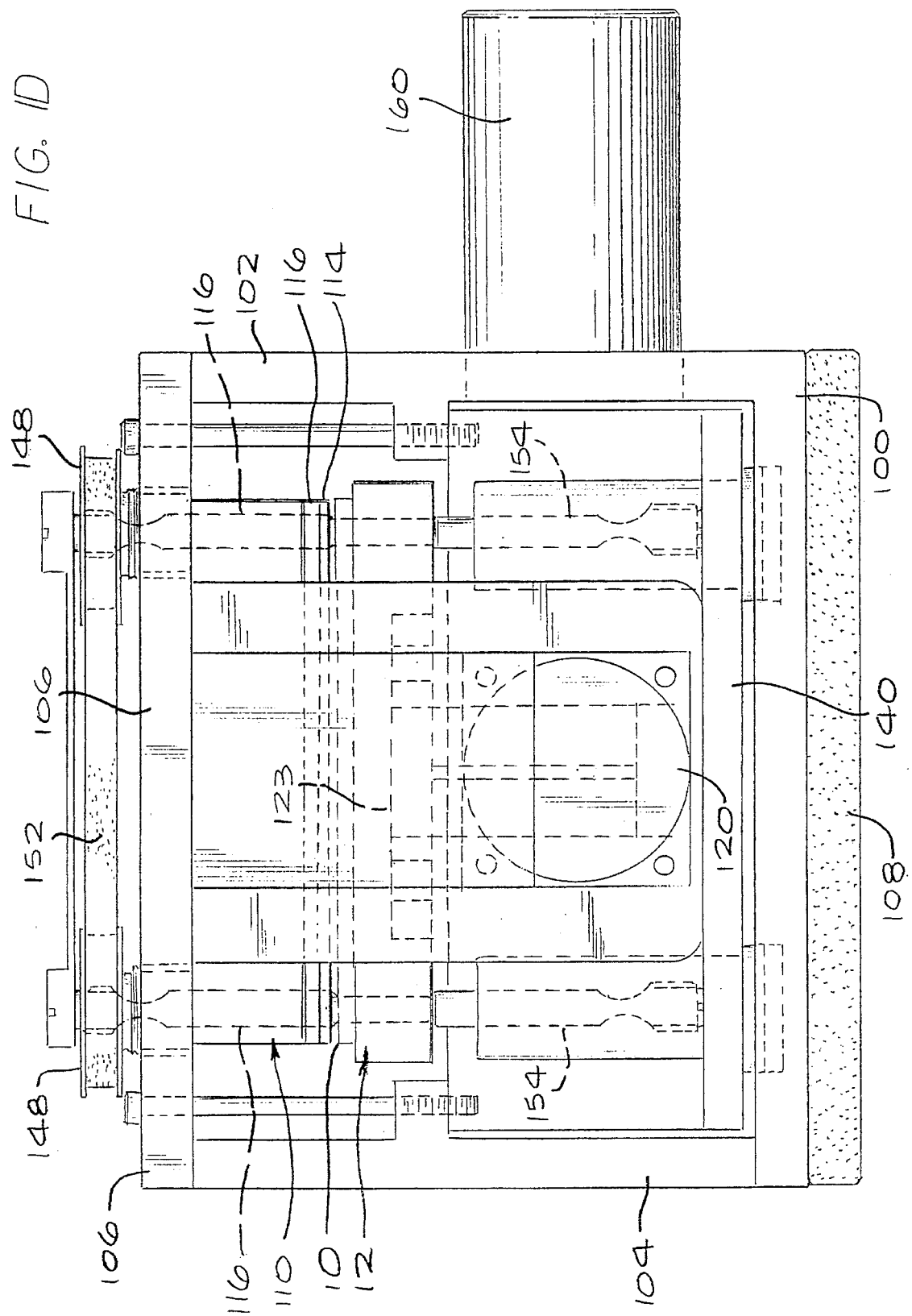

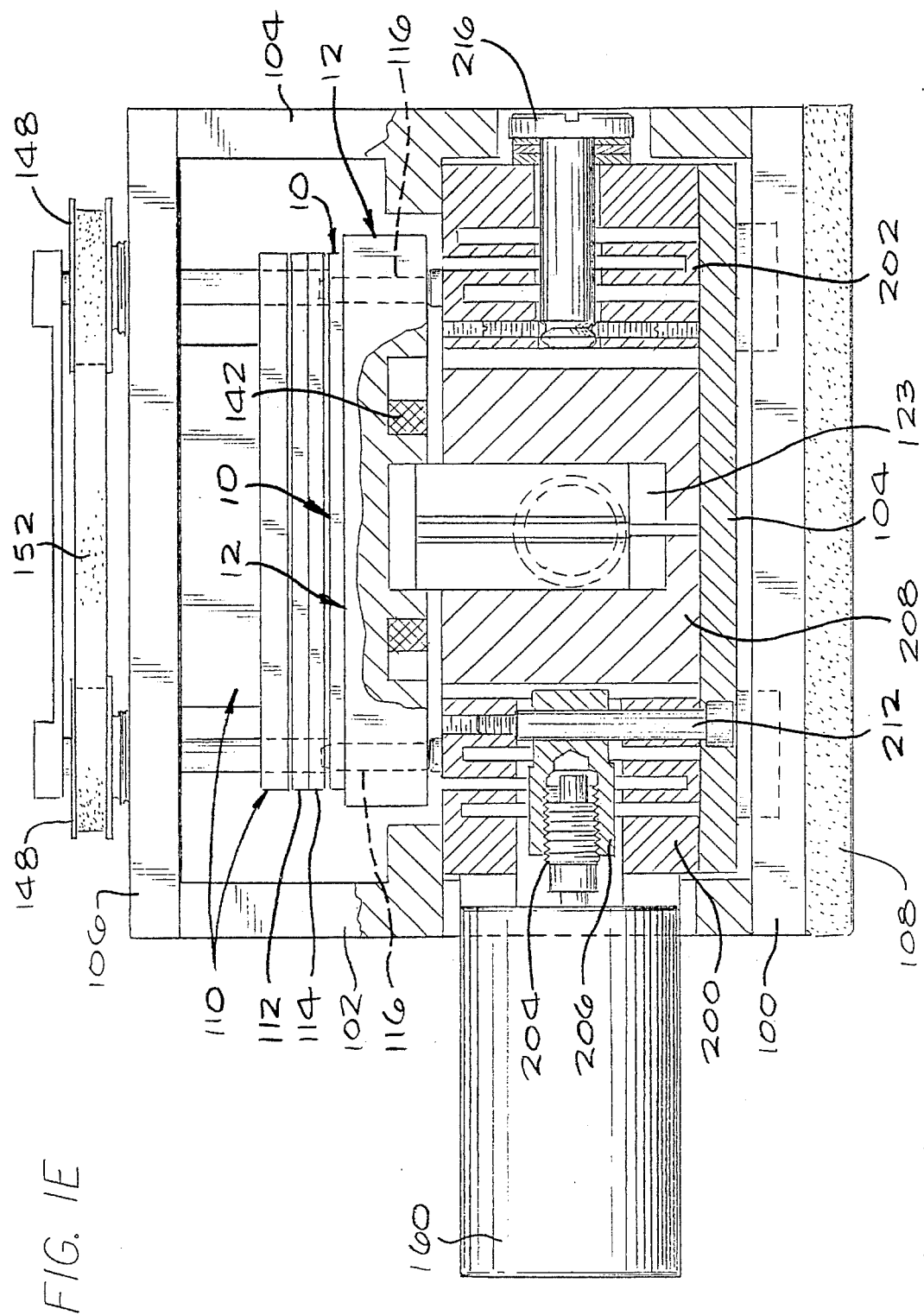

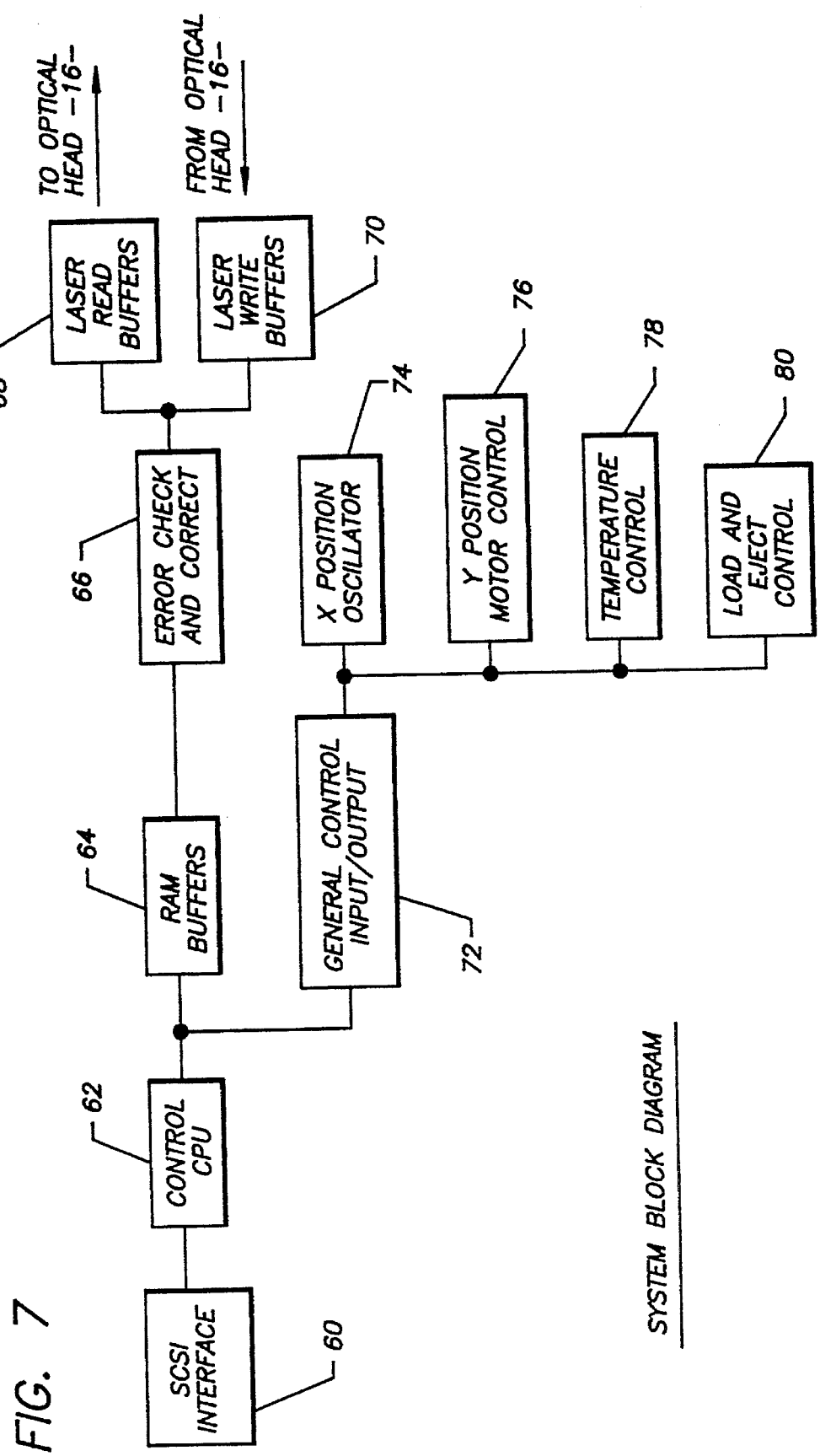

FIG. 10(A)
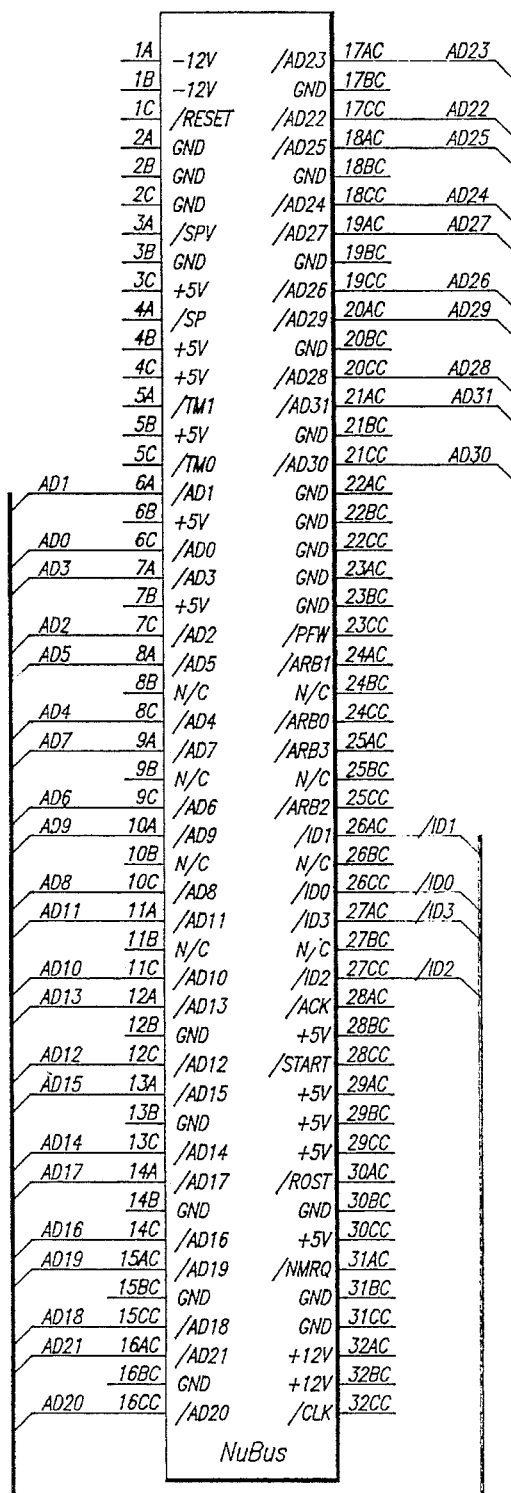
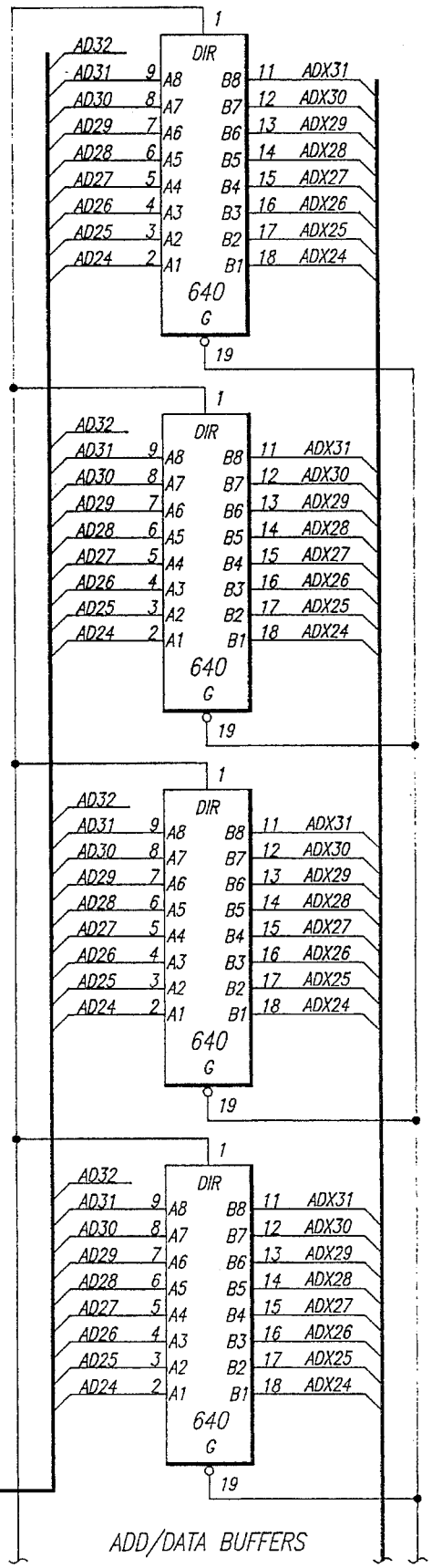
ADD/DATA BUFFERS

DATA BUFFERS

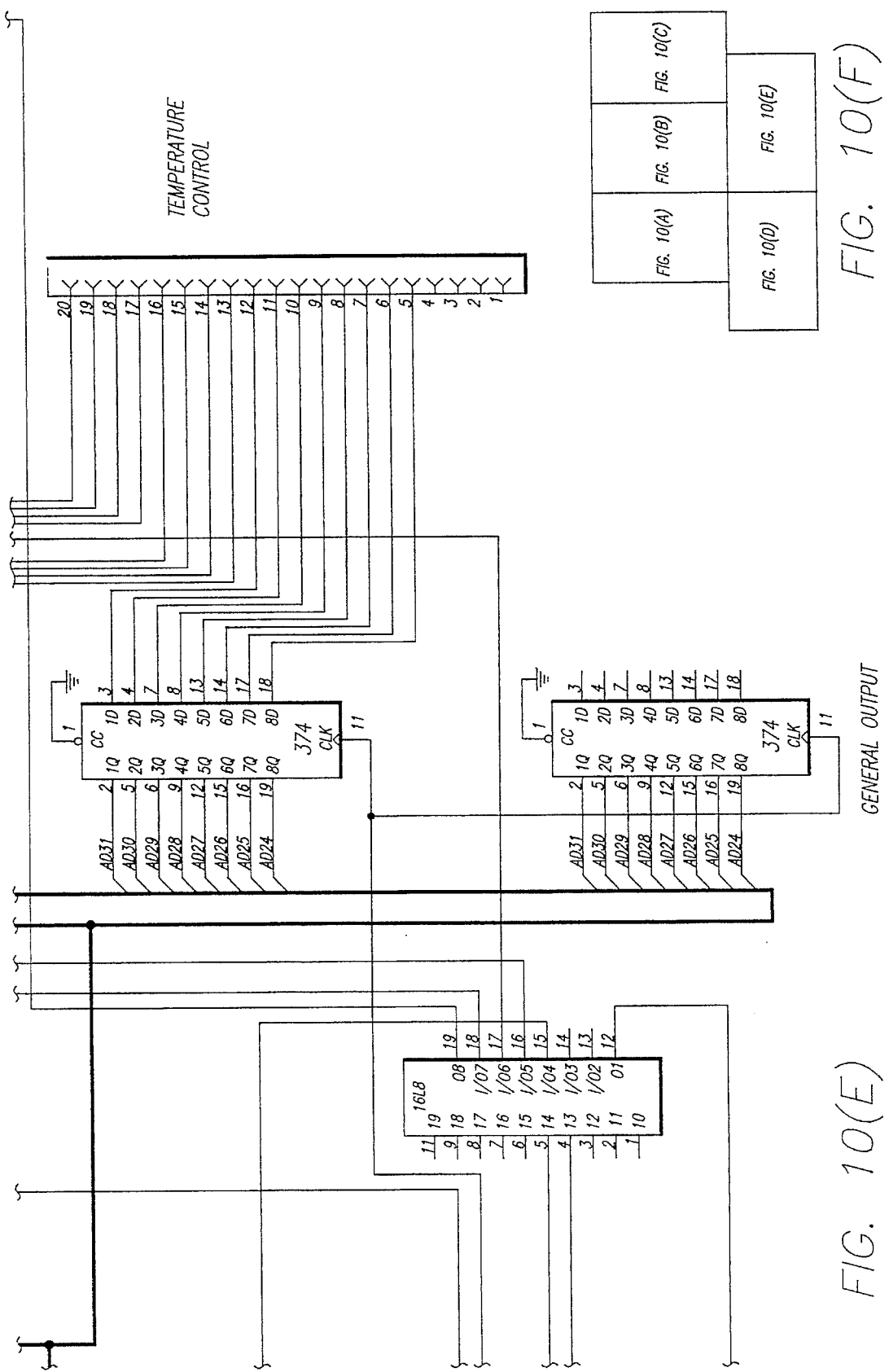

SERVO
AMPLIFIER
CIRCUIT
-102-

HIGH-SPEED OPTICAL RECORDING AND PLAYBACK APPARATUS CAPABLE OF RECORDING AND RETRIEVING DIGITAL DATA FROM AN OPTICAL STORAGE CARD

BACKGROUND OF THE INVENTION

The present invention is concerned with digital data recording and playback apparatus which includes an optical recording and playback device, and which is capable of recording and retrieving digital data representing digital or analog signals onto and from an optical storage card at high speeds.

The apparatus of the invention finds utility in the system described in co-pending application Ser. No. 619,098 filed Nov. 28, 1990, and assigned to the present assignee. The apparatus of the invention is of the same general type as the optical recording and playback apparatus described in co-pending application Ser. No. 845,331 filed Feb. 10, 1992, likewise assigned to the present assignee.

Co-pending application Ser. No. 619,098 discloses a digital broadcast system for the transmission of production quality stereo audio program material, video program material and other data. The system of application Ser. No. 619,098 comprises a number of transceiver units, each capable of operating in each of several modes, that is, in a recording, transmitting, receiving and playback mode. In the transmitting mode, one of the transceiver units in the system is capable of transmitting video or stereo audio data in digital form, either in real time or at high speeds, to other transceiver units over a selected common channel, such as fiber optic, cellular UHF, microwave, or satellite. In the receiving mode, the transceiver unit is capable of receiving data from other units of the system in digital form, and of converting the received data back to its original analog form.

The data storage card which is used in conjunction with the optical recording and playback head of co-pending application Ser. No. 845,331, and in conjunction with the apparatus of the present invention, is an optically encoded data storage card which may be of a size, for example, of a usual credit card. Both sides of the card may be utilized, and the card may have the capability of storing approximately one-half gigabyte of digital data on each side, this being the equivalent of approximately one double-sided record album per side, without compression of data.

Unlike the usual prior art video or compact disk, the optical storage card used in the system to be described does not spin. The elimination of the prior art mechanical compact disk drive, and other requirements, in the system of the invention results in significant accelerated write and access speeds and cost reduction.

The optical recording and playback head of co-pending application Ser. No. 845,331 includes a multiplicity of miniature lasers arranged in rows and columns. The lasers are directed to the data storage card. In the write or record mode, data is stored on the card by the lasers. In the read or playback mode, the data previously stored on the card is retrieved by the use of lasers and photo diodes. The apparatus of the present invention, as will be described, also includes a recording and playback laser head comprising a multiplicity of lasers, and photo diodes similar in some respects to the head described in co-pending application Ser. No. 845,331. However, in the apparatus of the present invention, the data storage card itself is moved in the X- and Y-directions for scanning purposes, whereas in the apparatus of co-pending application Ser. No. 845,331 the laser beams are scanned over the data storage card while the card is held in a stationary position.

The digital data optical recording and playback apparatus of the invention, in the specific embodiment to be described, comprises an optical head consisting of a flat two-dimensional array of laser diodes and photo diodes. The data storage card on which digital data is to be recorded is positioned below the laser and photo diode array, and a mechanism is provided to move the card in both the X- and Y-directions to position the array of lasers and photo diodes over any one particular location (out of 1,000×1,000=1,000,000) on the card.

The laser and photo diode array may consist, for example, of 4,000 elements arranged in a two-dimensional manner, with each element consisting of one laser diode and one photo diode.

An electronic section is also provided in the apparatus for multiplexing signals applied to and derived from the laser diode and photo diode array, and also to interface the optical head of the apparatus with a central processing unit (CPU).

BRIEF DESCRIPTION OF THE DRAWINGS

FIG. 1 is a schematic representation of the mechanical layout of the digital data optical recording and playback apparatus of the invention in one of its embodiments;

FIG. 1C is an elevational view of the apparatus taken from the opposite side;

FIG. 1D is an elevational view of the apparatus taken from one end;

FIG. 1E is an elevational view of the apparatus taken from the other end;

FIG. 7 is a block diagram of the electronic section included in the apparatus of the invention;

FIGS. 10A–10E are an electronic circuit showing a detailed implementation of the input/output circuit board of FIG. 9 and FIG. 10F is a diagram showing the manner in which FIGS. 10A–10E are to be positioned properly to represent the electronic circuit;

DETAILED DESCRIPTION OF THE ILLUSTRATED EMBODIMENT

Figure 1A:
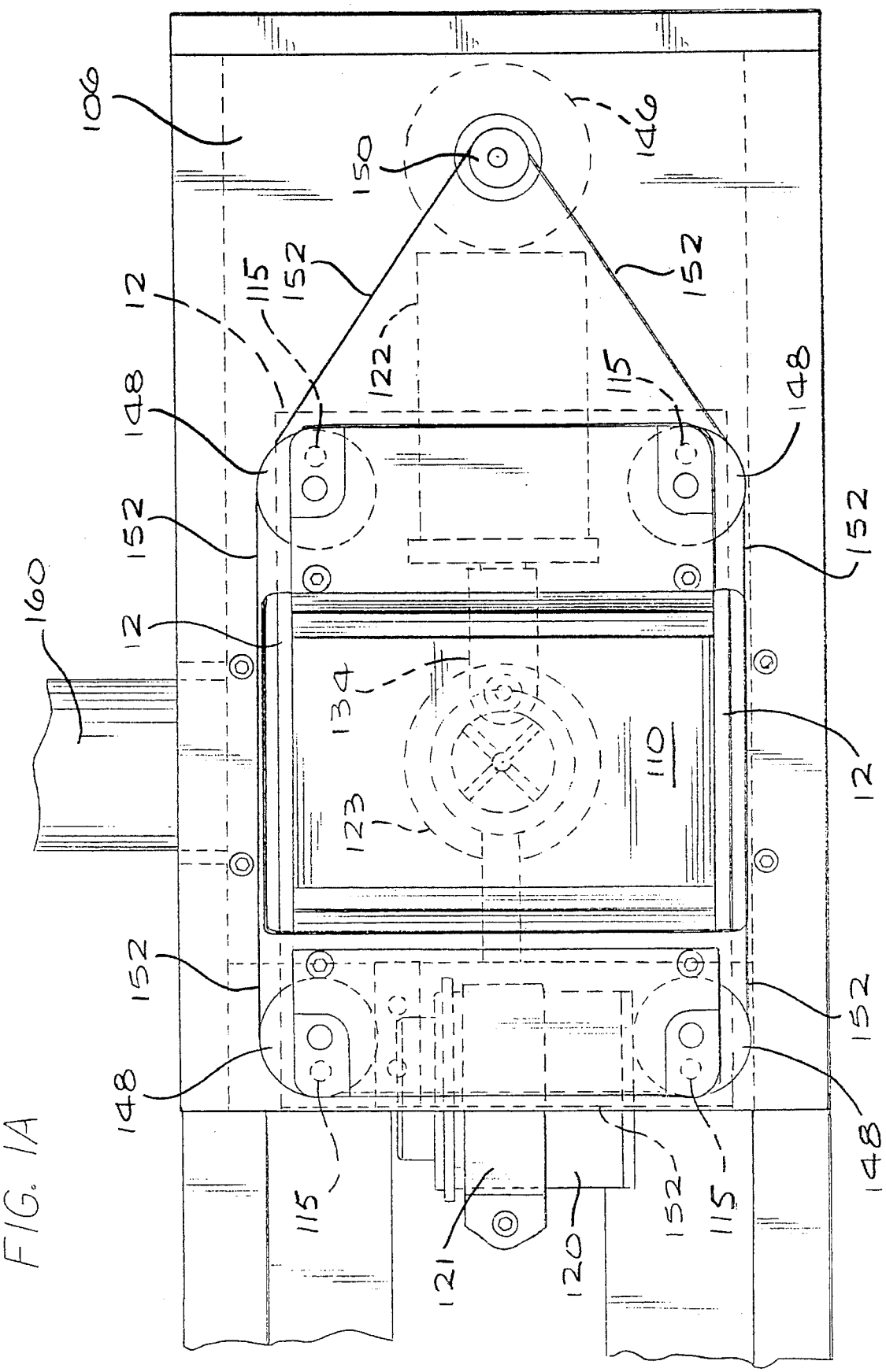
FIG. 1A is a top plan view of the apparatus.

The system of FIG. 1 shows an optical storage card 10 which is placed on a platen 12, and drawn into an optical head assembly 14. The optical head assembly 14 includes an optical head 16 and a rigid mount 18. Platen 12 and card 10 are positioned under head 16 and over mount 18, and a multiplicity of laser beams are directed to the card from the optical head. Platen 12 is constructed of any appropriate rigid material.

The card and platen are initially moved in the X- and Y-directions and rotated, as shown in FIG. 1, to align the card with the laser beams from head 16, and the card and platen are moved in the Z direction for focusing purposes. These movements are performed by independent servo systems, to be described. Accordingly, after card 10 has been positioned, the assembly 14 is aligned with the laser cells in the optical head 16. As mentioned above, X, Y, focus (Z) and rotational alignments are performed before operational scanning of the card can commence. The alignment is carried out by a focusing system and by data-sensing photo diodes in head 16 which read a pattern which is permanently encoded on the card. The pattern is generally similar to the pattern as described in co-pending application Ser. No. 845,331, and it comprises vertical and horizontal stripes serving as the card's absolute references.

After card 10 has been aligned with the lasers in head 16, motors controlled by appropriate electronic circuitry drive the holder 12 in the X and Y directions to perform a scan for writing data on the card and for reading data from the card. The X and Y motors operate simultaneously. Additional electronic circuitry is provided which the buffers write data and read data into a block. When the block is ready to be written or read, the scan begins. During scanning operations, the electronic circuitry transfers data either onto or from the card in a sequence, for example, of one to thirty-two read or write operations.

During a read operation, the resulting data is buffered and subsequently transferred as internal to host computer (motherboard), to be described, which in turn transfers the data through SCSI, or uses the data directly for audio or video reproductions. The motherboard may include auxiliary boards, for example, one for audio, one for video, one for motor control, one or more custom boards for memory interfaces, and a board for miscellaneous inputs/outputs. The system also includes, for example, a liquid crystal display and a matrix keyboard, with associated LCD and keyboard controllers.

The optical head assembly 14 of FIG. 1 includes a mechanism which is capable of both positioning the card under head 16 and detecting the position of the card, as well as seating the card in position for the electro-optical system to read data from the card or write data on the card. In actual practice, the card 10 is inserted about halfway into the optical head assembly 14, and it is then drawn into the assembly and set in platen 12. Platen 12 keeps the card flat to within 50 micrometers. Ejecting the card is effected in actual practice by moving the card up and out of the internal platen 12, and by partially ejecting the card about halfway out of the assembly.

To summarize, a card transport mechanism is provided in the apparatus of the invention which serves to seat the storage card 10 in the platen 12, and to read the card by a series of X—Y moves at high speed using DC Servo Systems to achieve the necessary alignment and scanning operations. Incorporated in the apparatus is a mechanism which moves the card 10 in the two-direction relative to the laser and photo diode array of head 16 for focusing purposes. FIGS. 1A–1E illustrate the details of the optical-mechanical apparatus which carries out the foregoing operations.

Figure 1B:
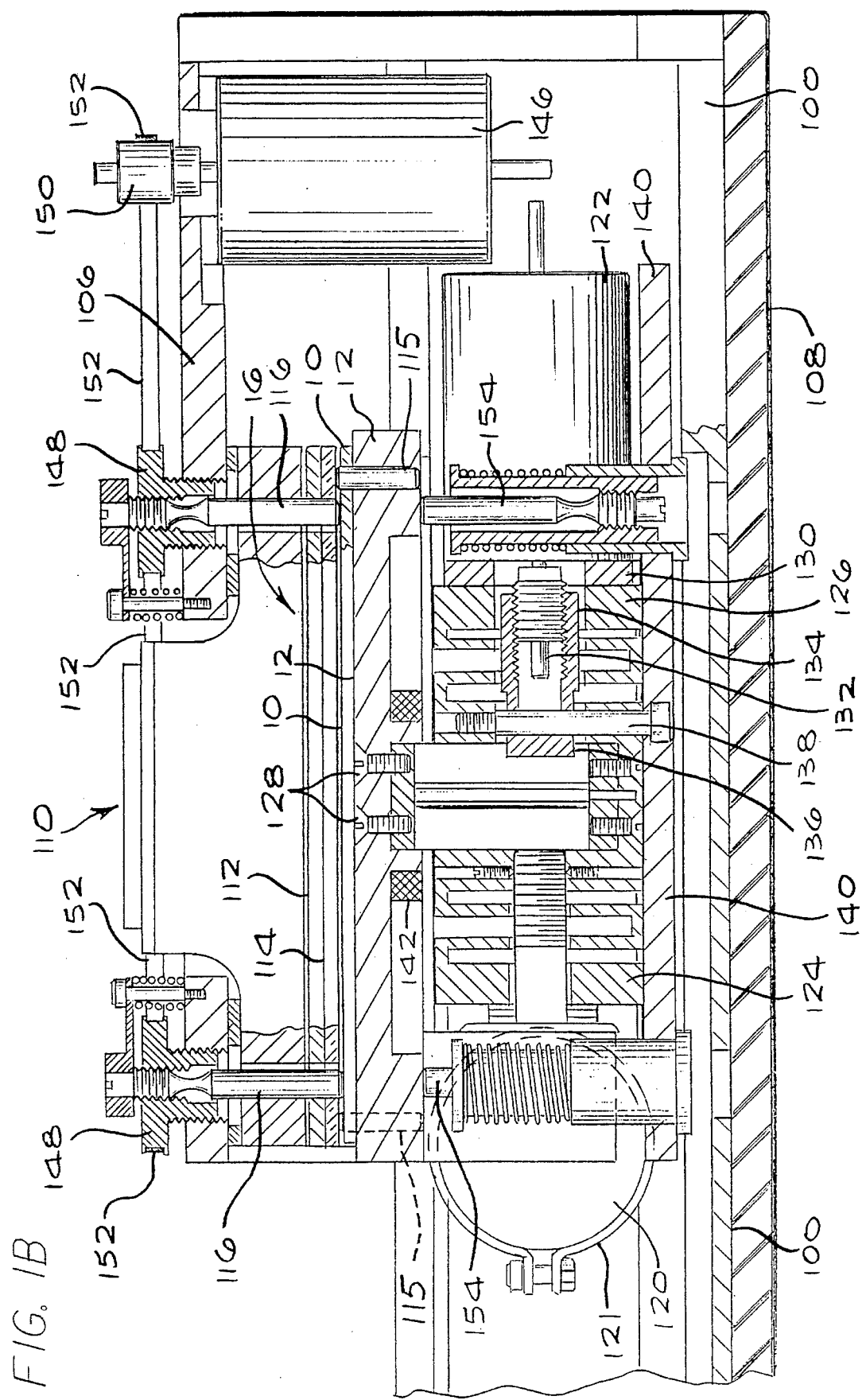
FIG. 1B is an elevational view of the apparatus taken from one side.

Referring now to FIGS. 1A–1E, the illustrated apparatus includes a bottom plate 100 (FIGS. 1D and 1E), side plates 102 and 104, and a top plate 106. A layer of silicon rubber 108 may be adhesively attached to the bottom plate 100 for damping vibrations. As best shown in FIG. 1B, the laser and photo diode array head 16 is mounted in a housing 110 which, in turn, is mounted in the apparatus. A spacer 112 is mounted under the head 16, and appropriate optical elements 114 are mounted under the spacer. The card 10 is supported on the platen 12 under the optical elements 114. The laser-optical interface formed by optical elements 114 is an array of collimating and focusing holographic lenses processed onto a single piece of glass.

The optical storage card 10 is a thin rewriteable phase-change type. When the material of the card melts it becomes transparent in the amorphous state. Upon cooling it remains transparent. Heating to another temperature causes the material to change to a crystalline state. The physical appearance of the material is such that light is reflected from each state differently so that photo diodes in the laser array of head 16 may be used to read recordings on the card, which are made by the lasers of the head which selectively melt spots on the card.

There are four (4) holes in card 10 which mate with four (4) pins, such as pin 115 at each corner of platen 12. The card rides against four automatic focus differential screws, such as screws 116, which are located at the corners of the card adjacent to the holes which receive pins 114.

Direct current servo motors included in the apparatus drive the card 10 into a precise position with respect to the laser and photo diode array in head 16, and provide constant velocity scanning movements of the card within specific distances and time limits. Focus, X—Y and angular servo systems initially focus and align the card 10 with respect to the laser array and move the card in such a manner as to position any one point out of 1024 four sets directly under each of the 50 rows and 80 columns of laser cells and photo diodes in the array of head 16. The X—Y positioning system allows the array of 4,000 lasers to reach any one of a million sets of points on card 10 within an average of 10 milliseconds. During this operation the alignment control servo controls the card alignment, and focus control maintains the card in focus.

Required flatness accuracy of storage card 10 is maintained by platen 12. Four referencing spring loaded flexures 154 serve to index the card 10 with respect to the laser array of head 16. Four flexures 154 are axially aligned with screws 116 and operate in conjunction with the four automatic focus differential screws 116, referred to above, and serve to bias the platen against the screws. The platen 12 is sufficiently rigid in order to operate in a 50 Hz X—Y scan environment and up to 5 g accelerations.

The focusing system will focus the whole card at one time after focus has been set by the initial alignment. A central rotary flexure on the platen 12 allows angular movement of the platen to be provided by a voice coil 120. This voice coil drives the platen relative to the X—Y stage inner axis. The voice coil 120 is held in place by a clamp 121 (FIG. 1B).

The apparatus includes a motor 122 for driving the platen 12 in the X direction and against resilient members 124 and 126, the platen 12 being attached to the resilient members by screws 128. The X-motor 122 is supported on a mount 130. Its drive shaft 132 extends through a nut 134 which is supported in a bushing 136 held in place by a bolt 138 which extends through a base plate 140. Rotation of the X-motor 122 causes the platen and the base plate 140 to move relative to the casing against the compression of the resilient members 124 and 126. A Y-motor 160 is also mounted in the apparatus, and its serves to move the card 10 and platen 12 in the Y-direction with respect to the laser cell and photo diode array of head 16.

An automatic focus motor 146 is also mounted in the apparatus it drives a series of four timing pulleys 148 by means of a drive pulley 150 mounted on its drive shaft, this being achieved by a timing belt 152. Pulleys 148 are mounted on respective flexure screws 154 which engage the front surface of the card 12 at each corner. Turning of the automatic focus motor 146 in one direction causes the four screws 116 to bias the card 10 and platen 12 downwardly against the force of the corresponding four preloaded flexures 154, which are mounted directly under respective ones of the screws 116. Accordingly, rotation of the automatic focus motor 146 in one direction moves the card down and away from the laser array of head 16, and rotation of the automatic focus motor 146 in the opposite direction allows the pre-loaded flexures 154 to move the card upwardly toward the head 110, so that focusing may be achieved.

An electro magnet 142 is mounted under platen 12, and it constitutes a magnetic chuck for holding the optical storage card 10 flat on the platen 12. It is possible to use a permanent magnet to hold the card 10 in place on platen 12. However, the electromagnet 142 allows more flexibility in the holding force, since the electromagnet may be turned off and enable the card 10 to be easily released from the platen to enable the platen to be cleaned between card operations. The card 10 has four indexing pin holes which are located at each corner for receiving the pins 114 in precise registration with platen 12.

The coefficient of expansion for the optical storage card 10 is selected to match the coefficient of expansion of other cards as a primary requirement, and the optical head components as a secondary requirement.

The optical storage card 10 is made, for example, from Invar for low coefficient of thermal expansion to minimize temperature control requirements for very high density recording. The card has an extremely flat replicated surface which includes the thin coating of recording material and other coatings. The match of the coefficients of expansion of the card materials with the platen 12 is an important aspect of the apparatus. The card is covered with the mylar coating except for the areas around the automatic focus screws 116, indexing holes, and flexures 154. A protective coating of nickel, chrome or other appropriate material, may be placed on the Invar to protect the edges and bores of the indexing holes. The card coatings may be replicated on the Invar read-write surface so that it is extremely flat. The flat card coating may be replicated on the Invar card by building up coatings on a master glass plate, and then by using epoxy as the last layer to bond the Invar card to the coatings molded to the master glass plate.

Encoder reference markings are placed on the card 10 to form focusing, centering and position sensor references. At least four encoder reference markings preferably are placed on the card for location of the starting point, angle, focus, and scan positions. The encoder reference markings may take the form of small blocks located on the card with respect to the locating pin holes. Since reference encoder blocks are pre-written, only low power lasers and reading diodes are required at those points.

The X—Y translation stage is controlled by the X-motor 122 and its flexure members 124 and 126 (FIG. 1B); and the Y-motor 160 and its flexure members 200 and 202, (FIG. 1E). The shaft of the Y-motor 160 is keyed to a drive screw 204 which forces a threaded bushing 206 to the right in FIG. 1E. Platen 12 is threaded to a block 208 which, in turn, is mounted on base plate 104, whereas bushing 206 is attached to the base plate by a screw 212. The base plate moves against the flexure 202 which is adjusted by a screw 216.

The flexure members 200 and 202 for the Y-motor 160, as well as the flexure members 124 and 126 for the X-motor 122, are in the form of flexure slides. Such slides do not have sliding or rolling surfaces so they have no friction or striction and do not require lubrication. The stiffness of the flexures and pro-load springs add to friction motor loads during acceleration, and this requires higher motor power. Accordingly, the weight of platen 12 is reduced as much as possible by providing a reduced section thickness and making it in three parts, one of which is aluminum. The X—Y flexures also act as heat sinks for the X and Y motors 122 and 160.

The Koford 22 millimeter diameter series of motors are appropriate to be used for X, Y and automatic focus motors in the apparatus of the invention. Such motors may be pulsed higher than rated power for several milliseconds to move and stop at given point. For example, a 22 micron diameter, 12 volts, 12,500 rpm Koford motor is appropriate. A 4-watt Koford motor may be pulsed as high as 112 watts for several milliseconds at a time.

The voice coil 120 is used to move platen 12 in torsion. It moves the center angular flexure 123 through a small angle to turn the card. The voice coil is sized with respect to the center flexure 123 and platen 12. Since the X—Y flexures are spring loaded, it is less critical to have perfect fits at each drive interface. The automatic focus drive is constructed to have minimal cross coupling effect for the X—Y servos to correct.

The automatic focus motor 146 operates at smaller signal amplitudes then the X and Y motors 122 and 160, but with a higher mechanical advantage. Once the card is moved into focus there are minimal correction requirements, so that the response time for automatic focus for large travel occur only at the beginning of a run, and only small corrections will be needed subsequently.

Holographic Optical Element (HOE) micro lenses of glass with single surface diffraction patterns are used in the optic interface 114. The lens configuration is such as to achieve two main functions of writing directly onto the storage card and reading back from the storage card 10 through the same optical system. Such HOE lenses offer an answer to the problem of utilizing more of the total laser output to achieve spot sizes on the order of 0.7 micrometers. A number of different laser array technologies may be used in head 110. The holographic lenses in the optic interface may contain one or more gratings to reflect reflective light to the detecting diodes in head 110. This enables full apertures to be used for writing, and the reading diodes can be located off axis from the laser diodes.

Adequate Optical performance using split apertures with one millimeter grid is not feasible for an output spot size of 0.7 micron using an array of glass lenses. Such lenses cannot be economically manufactured. The holographic lens, or HOE, is the preferred solution. The lens array should also contain a grating HOE at the edges of the field to deflect light so that all reading diodes in the array can be off axis from the laser cells, as mentioned above. By using two or more diodes per laser with one further off-axis than the other, a differential approach may be used to obtain a higher signal-to-noise ratio from the media.

The array of collimating and focusing holographic lenses in the optic interface 114 must be very accurate as they must provide the 1 millimeter spacing accurate to one micrometer spacing required for the system to function in read and write modes with interchangeable cards 10. Technology exists to locate HOE's on glass to better than 0.2 micrometers tolerances by making a master and then stepping that master to make an array master. Since there is a reduction in size of the laser beam, the tolerances at the laser arrays are not quite as extreme as in the cases of the HOE array output at the card. The HOE array preferably is a one piece part with temperature control that may be obtained in an aperture plate interface. Temperature control is a significant problem in the laser and hoe arrays.

Figure 2A:
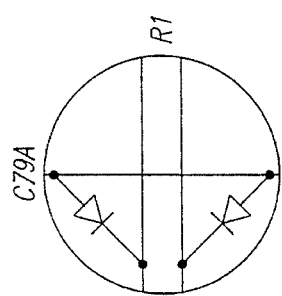
FIG. 2A is an expanded representation of a portion of the array of FIG. 2 designated by the broken circle.
Figure 2:
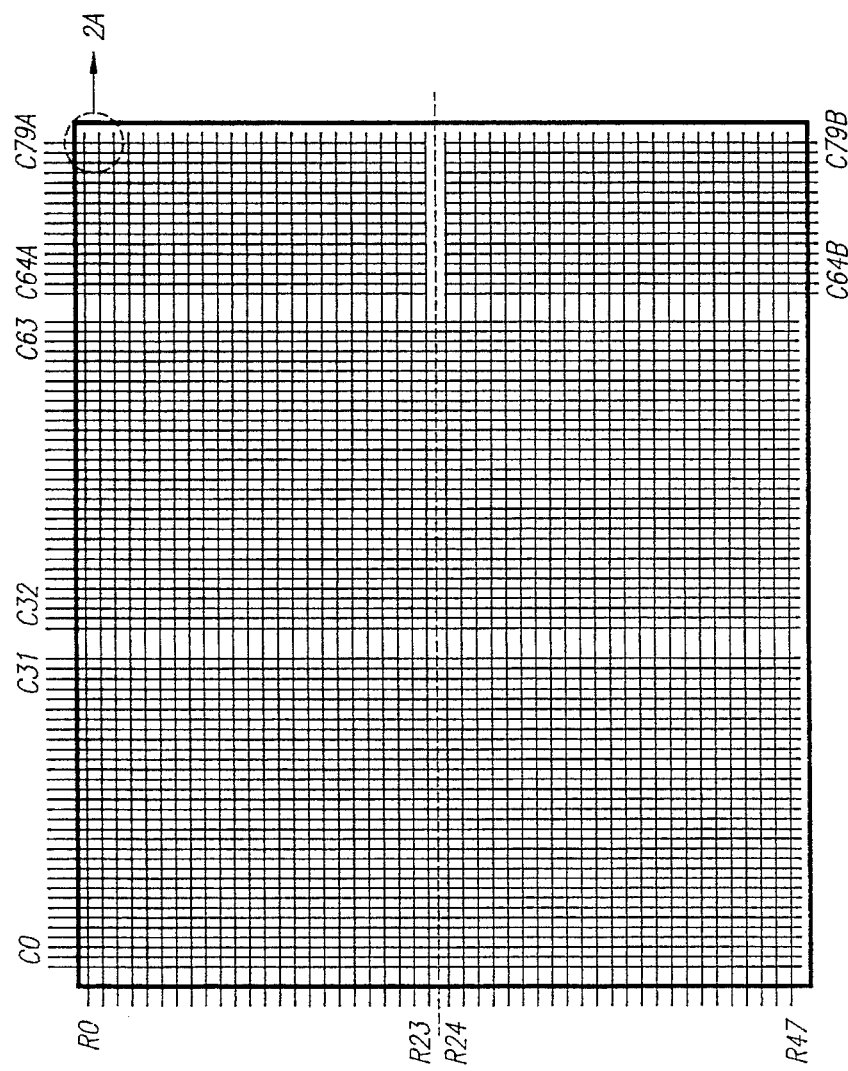
FIG. 2 is a schematic diagram showing the matrix wiring of the laser diode and photo diode array.

The laser photo diode array of optical head 16 of FIG. 1 is shown schematically in FIG. 2. Specifically, the schematic of FIG. 2 shows the matrix wiring of a 48×80 laser photo diode array. The circle at the upper right shows that at every cross between vertical and horizontal lines, there is connected a laser diode and a photo diode (FIG. 2A). Since there are 48×80 (3840) read-write junctions in the array under consideration, this means that there are 3840 lasers and 3840 photo diodes in the array organized as 48 rows and 80 columns of elements. Each laser diode is used to write and erase data on or from the storage card 10, this being achieved by changing the crystals deposited on a substrate of the card from a crystalline state to an amorphous state. Each photo diode is used both to read data and to monitor the writing intensity. The matrix of FIG. 2 has eighty lines (C0–C31, C32–C63 and C64A–C79A) projecting along the top and sixteen additional lines (C64B–C79B) along the bottom. In the configuration shown in FIG. 2, one row is energized and up to thirty-two columns may be concurrently energized if the columns are in the first two banks (C0–C63). If the last bank needs to be energized (C64A–C79B) then two rows, one from the top half (R0–R23) and the other from the bottom half (R24–R47), are simultaneously energized and then the 32 bits of column data are placed in columns C64A–C79B. There are actually ninety-six lines for the laser and photo diode column drives, and ninety-six lines for the rows consisting of forty-eight for the laser diode drives and forty-eight for the photo diode drives.

Figure 3:
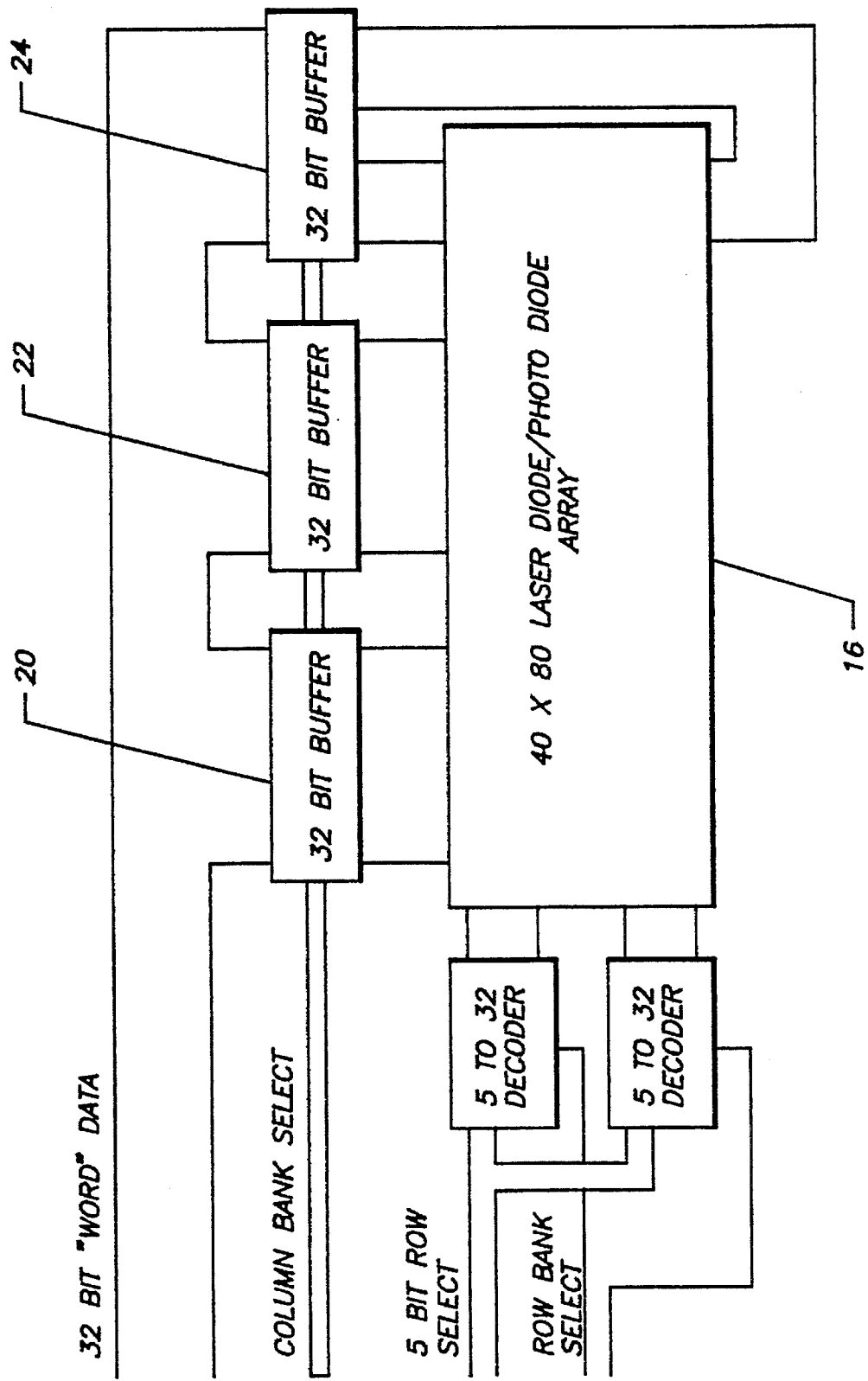
FIG. 3 is a schematic representation of appropriate multiplexing circuitry for use in conjunction with the laser diode and photo diode array.
Figure 4A:
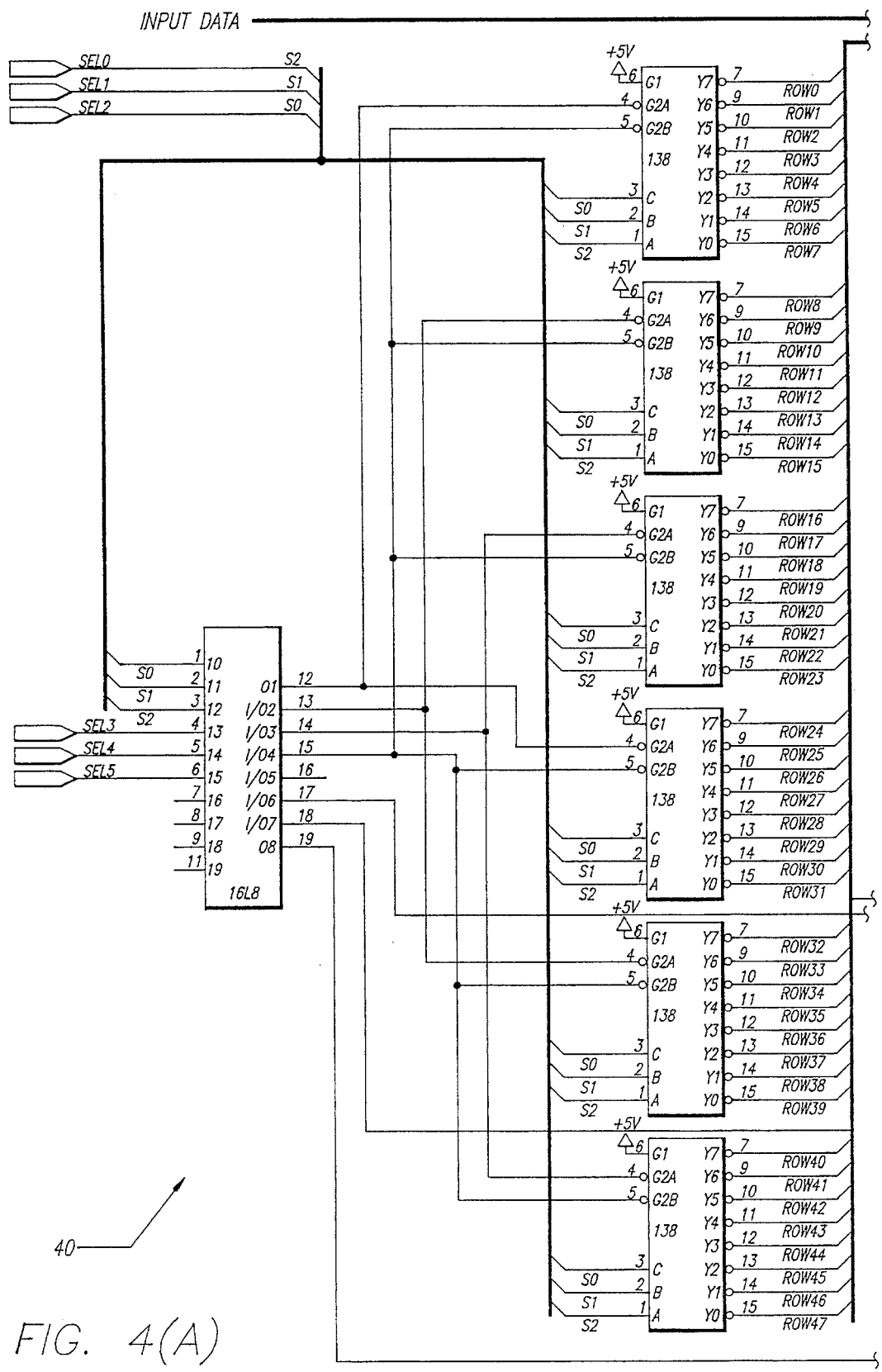
FIGS. 4A, 4B and 4C are a representation of electronic circuitry included in the circuit of FIG. 3.
Figure 4B:
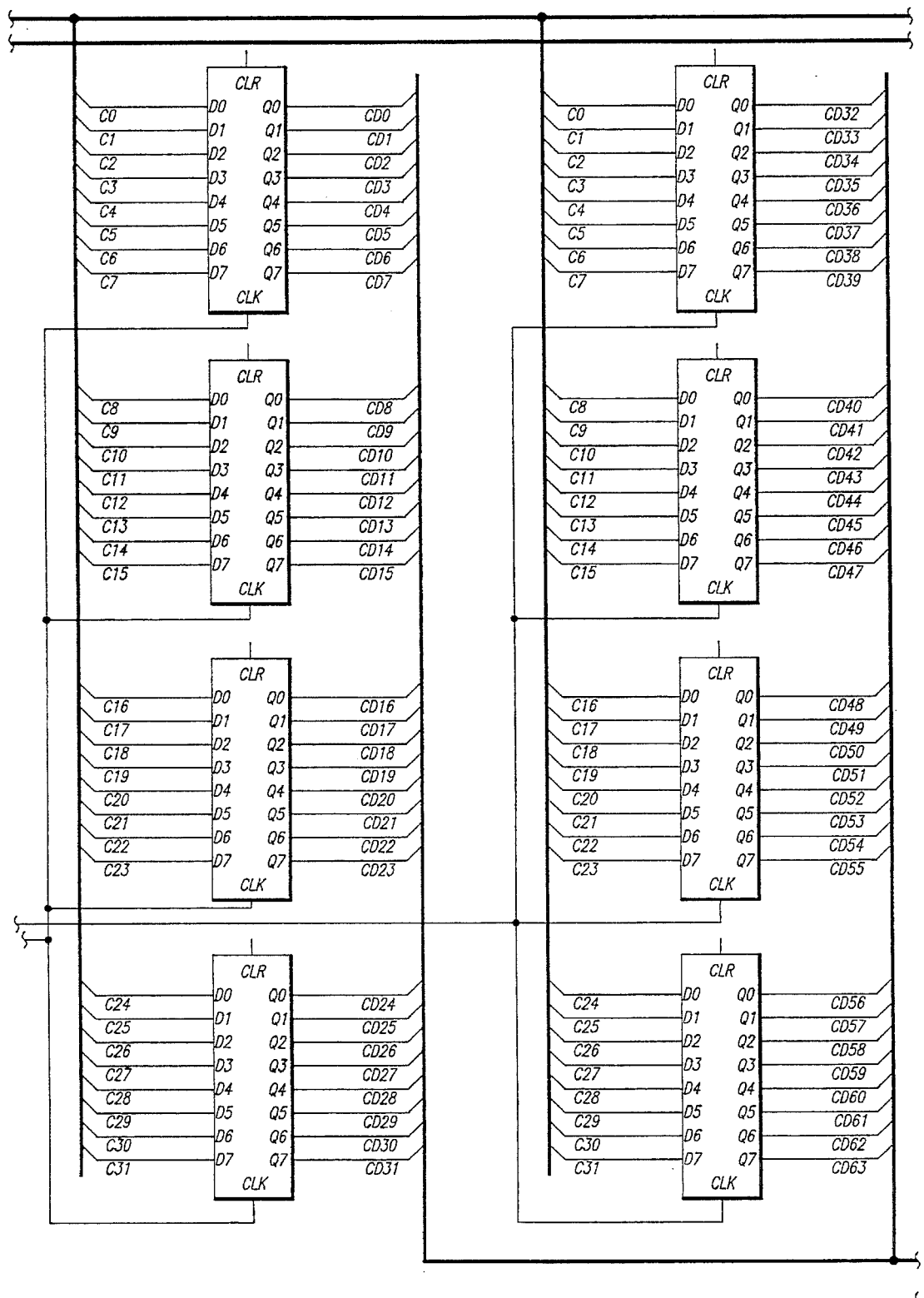
Figure 4C:
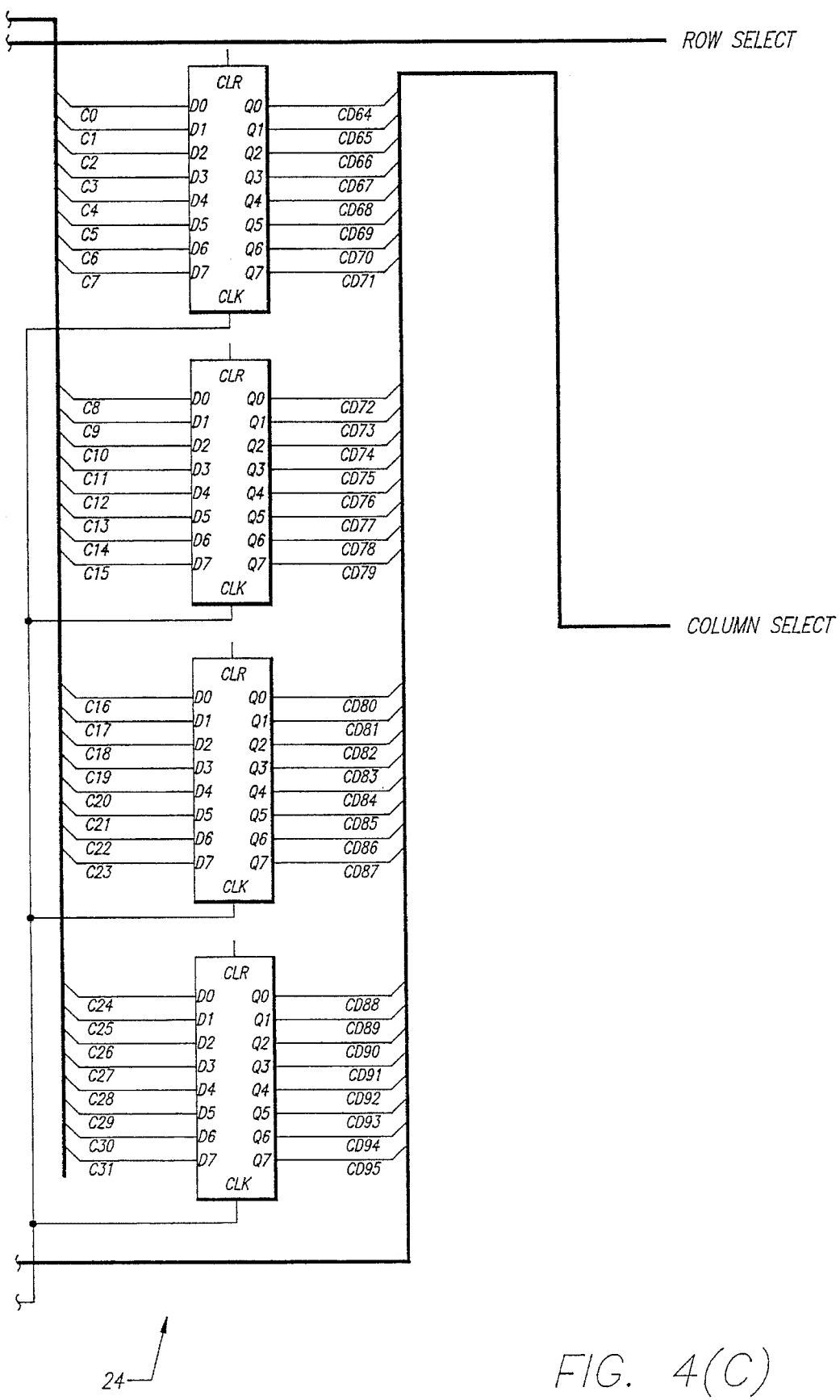

FIG. 3 is block diagram of logic circuitry associated with the laser/photo diode array of head 16 shown in FIG. 2. This circuitry is required so that physical connection to the laser/photo diode matrix of FIG. 2 may be practical since without multiplexing there would be at least 12,000 connections. Also, since the array of figures is organized in an X—Y manner, and only thirty-two elements need be accessed at any one time, further multiplexing may be used to reduce further the number of physical connections. The logic circuitry of FIG. 3 provides a linear array of 32-bit long words. Addressing is implemented by a low cost programmable logic integrated circuit (PAL). The output of the PAL consists of three lines which serve to select appropriate 32-bit buffer 20, 22 or 24, and five bits to select one of the twenty-four lines that select rows. Either the upper, the lower or both banks can be selected by the row bank select lines. Using the circuitry shown in FIG. 3, access to the array 16 is reduced from approximately 200 lines to 32 data lines plus 10 lines from the PAL.

Without using the technique shown in FIG. 3, the full read-write configuration would contain over 3,840 sets of laser diode/photo diode combinations. With direct wiring there would be approximately 12,000 wires going to the head. This is an impractical number to wire discretely, and therefore the multiplexing technique shown in FIG. 3 is used to simplify the interconnections. As shown in FIG. 3, the array is divided so that electrically it simulates 120 32-bit words, this being achieved by wiring and appropriate logic. The technique shown in FIG. 3 reduces the approximately 12,000 lines to about 100.

The laser diodes of the array of FIG. 2 are pulsed for 50 nanoseconds at one of three levels. The lowest is for reading the data on the storage card 12, and the other two levels are for writing either a one or a zero. The system of FIG. 3 buffers and effectively caches 120 32-bit words. In order to perform a write a host computer central processing unit (CPU) 62 (FIG. 9) initiates a full scan, and the data in the buffers is then written at the appropriate time into the laser diodes in one scan. Reading is performed as a single block read of 120 32-bit words. During a scan, successive reads from photo diodes are triggered into the buffers.

The focus system described previously utilizes a technique involving astigmatic lenses. The focusing system operates by focusing laser light precisely on a spot on the storage card and then having the spot reflect back through an astigmatic lens. The lens projects an oblong spot which falls on either of two pairs of photo diodes. The electronics responds to the signal to drive the focus motor and bring the output of the two pairs of detectors into equilibrium. This is achieved by the previous described Z-axis servo.

FIGS. 3, 4A, 4B and 4C show the laser drive out circuit of FIG. 3 in more detail, and it comprises the three banks of 32-bit buffers 20, 22 and 24 shown in FIG. 3. Also included is a column of PAL buffers 40 which implement the decoding of the signals derived by the head 16 from the storage card 10. The PAL buffers 40 also select the rows of the matrix of FIG. 2. The output of the circuit of FIG. 4 comprises the row and column drive signals.

Figure 5A:
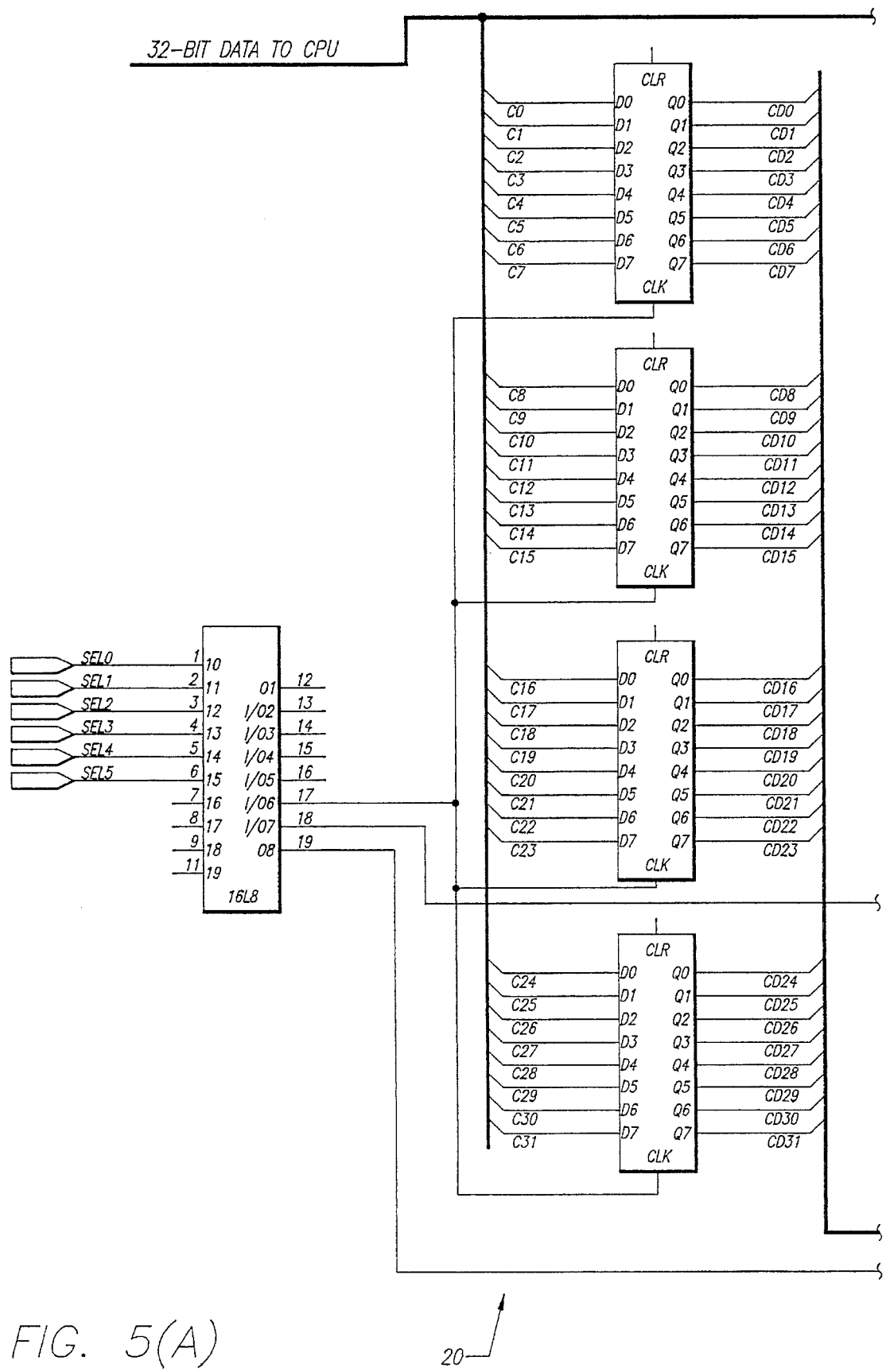
FIGS. 5A and 5B are a representation of drive circuitry connected to the laser diode and photo diode array.
Figure 5B:
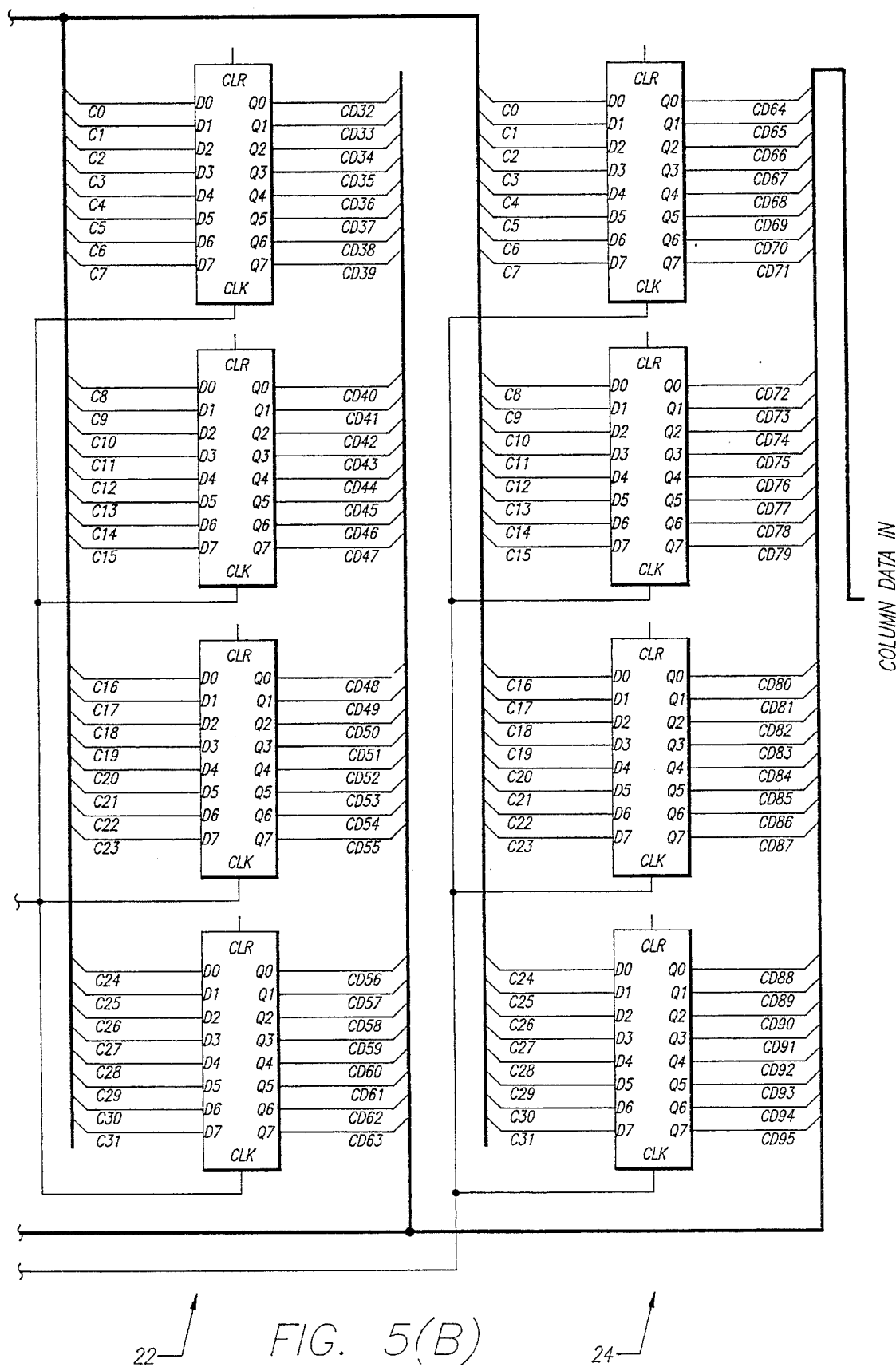

The circuit of FIGS. 5A, 5B comprises the laser drive in circuit and it comprises decoded buffers from the photo diodes of the matrix of FIG. 2. Three columns of buffers are shown, which are also designated 20, 22 and 24. Since the schematic of FIGS. 4A, 4B, 4C includes the decoding, the circuit of FIGS. 5A, 5B comprises just input buffers.

Using a focused beam of laser light, a spot size of less than one micrometer can be produced on the surface of the storage card 10. When focused on the active layer of the storage card for about 50 nanoseconds, the temperature will rise proportionately to the power applied. If the power is relatively high, about 20 milliwatts at the focused spot, the material will be amorphized, that is, made clear. If the power is 10 milliwatts, the material will crystalize. This "direct writing" of the material is one of the advantages over most magneto-optical methods which require an erase cycle which is not needed prior to writing phase-change media.

Figure 6:
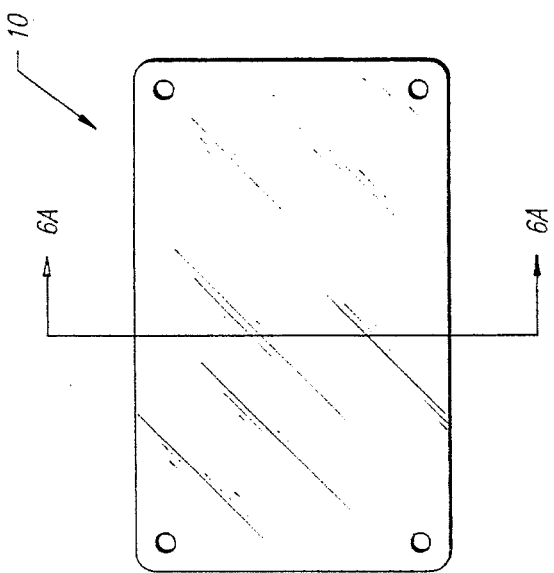
FIG. 6 is a plan view of the optical data storage card and a section through the card is shown in FIG. 6A.
Figure 6A:
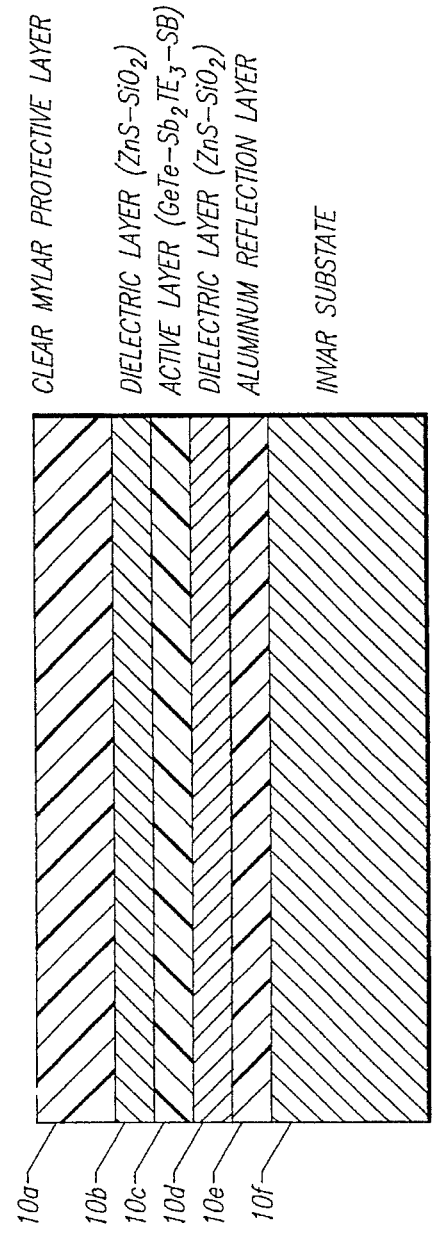

The storage card 10, as shown in FIGS. 6 and 6A, may have a size of 86 mm×54 mm; a thickness of approximately 1.6 mm; a read-write surface flatness of ±½ micrometer; a base material of Invar. The configuration of the storage card is preferably double-sided, so that data may be recorded on both sides.

As shown in FIG. 6A, the storage card is a lamination of a number of layers. It consists of a clear mylar protective layer 10a, a dielectric layer 10b, an active layer 10c, a second dielectric layer 10d, an aluminum reflection layer 10e, all deposited on an Invar substrate 10f. The layers are built up on the Invar substrate 10*f*. The substrate has a very low coefficient of thermal expansion in order to keep alignment with all of the lasers which make up the optical head 16 of FIG. 1. For that reason, the substrate is made of Invar, an alloy of iron and nickel with a very low coefficient of thermal expansion.

The subsequent layers include deposits for thermal dispersion, reflection, an active layer, and a protective layer. The layers are defined as follows:

Protective layer 10*a*—clear mylar—250 micrometers;
Dielectric layer 10*b*—ZnS—SiO2—150 nanometers;
Active layer 10*c*—GeTe—Sb2Te3—Sb—20 nanometers;
Dielectric layer 10*d*—ZnS—SiO2—150 nanometers;
Reflective layer 10*e*—Aluminum alloy—150 nanometers;
Metal substrate 10*f*—Invar (64% Iron and 36% Nickel)—1,000 micrometers.

The storage card 10 is a re-writable phase-change type. In constructing the card, a crystalline material is deposited on an Invar substrate. When heated past a certain point (the Curie point), the material melts and becomes transparent. This is called the amorphous state. Upon cooling, the layer remains transparent. Heating to another temperature causes the material to change to a crystalline state. The physical appearance of the two states is such that light is reflected from each one differently and the photo diodes of the optical head 16 can sense which state the material of the active layer 10*c* is in. The card has a protective layer 10*a* of clear mylar plastic to reduce the effects of dust and dirt. The card is relatively thick, approximately 1.3 mm. The double-sided card is fabricated by duplicating the deposited layers on both sides of the substrate 10*f*.

As previously mentioned, the card is a re-writable phase-change optical type. The active layer 10*c* is written by the laser diodes of the head 16 at approximately 830 nm wavelength. The card is used to store data by changing the state of the crystalline active material of layer 10*c* between two distinct states, crystalline and amorphous.

A block diagram of the electronic section of the apparatus of the invention is shown in FIG. 7. The electronic section includes a SCSI (Small Computer System Interface) shown as block 60 which interfaces the section with a host computer. The section is designed to emulate a read/write disk storage system. The interface block 60 is connected to a control CPU 62 which may be a host computer's motherboard. The CPU controls the reading and writing to RAM buffers 64 which are filled and emptied through an error checking and correcting circuit 66 as data is fed to the lasers of the optical head 16 or received from the photo diodes. Laser read buffers 68 and laser write buffers 70 may be provided to interface the system with the physical devices.

An input/output section designated by block 72 is also controlled by the CPU 62. This latter section is used to control the X and Y position motors through servo control circuits designated by blocks 74 and 76, as well as a temperature control system represented by block 78, and the control circuit for the storage card load and eject motors of the assembly 14 of FIG. 1, as represented by block 80.

Figure 8:
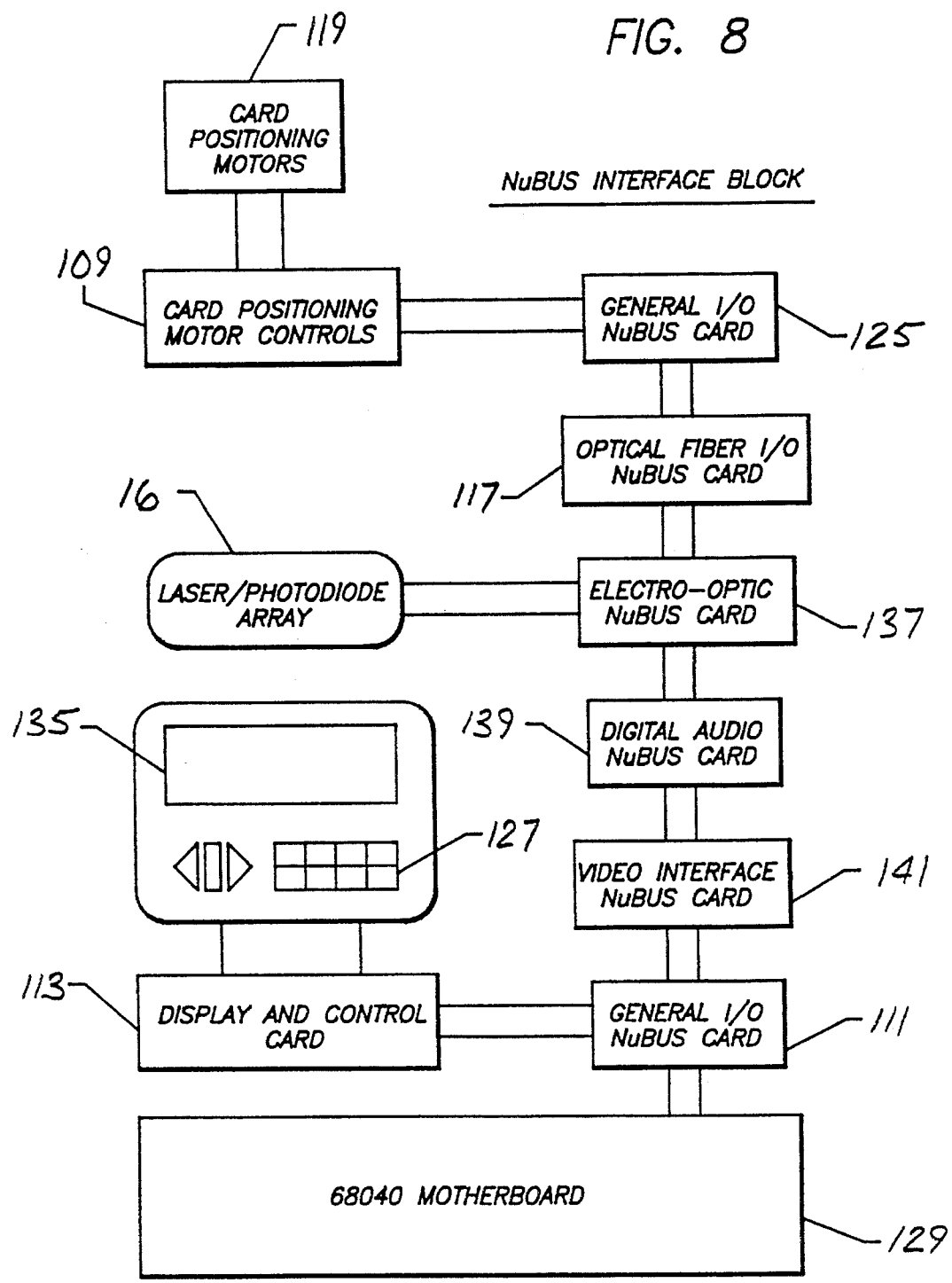
FIG. 8 is a schematic representation of optical data storage circuitry included in the apparatus.

As stated above, the apparatus of the invention and its electronic circuitry is built around a computer motherboard 129 in the circuit of FIG. 8 designated "NuBus Interface Block." The block has a number of NuBus circuit cards, including circuit card 139 for audio, circuit card 141 for video, a general input/output circuit card 125 for the card positioning motor control 109 which, in turn, controls the card positioning motors 111. The circuit also includes an electro-optic circuit card 137 which controls the laser/photo diode array of head 16, and an optical fiber input/output circuit card 117. The block also includes a general input/output circuit card 119 which controls a display and control circuit card 113 which, in turn, controls an LCD display 135 and the keyboard 116 interface.

The block also has display and control functions which are controlled through the general input/output circuit cards 106 and 110. The optical fiber input/output circuit card 114 provides high speed digital communication with like systems for high speed video and audio downloading.

Figure 9:
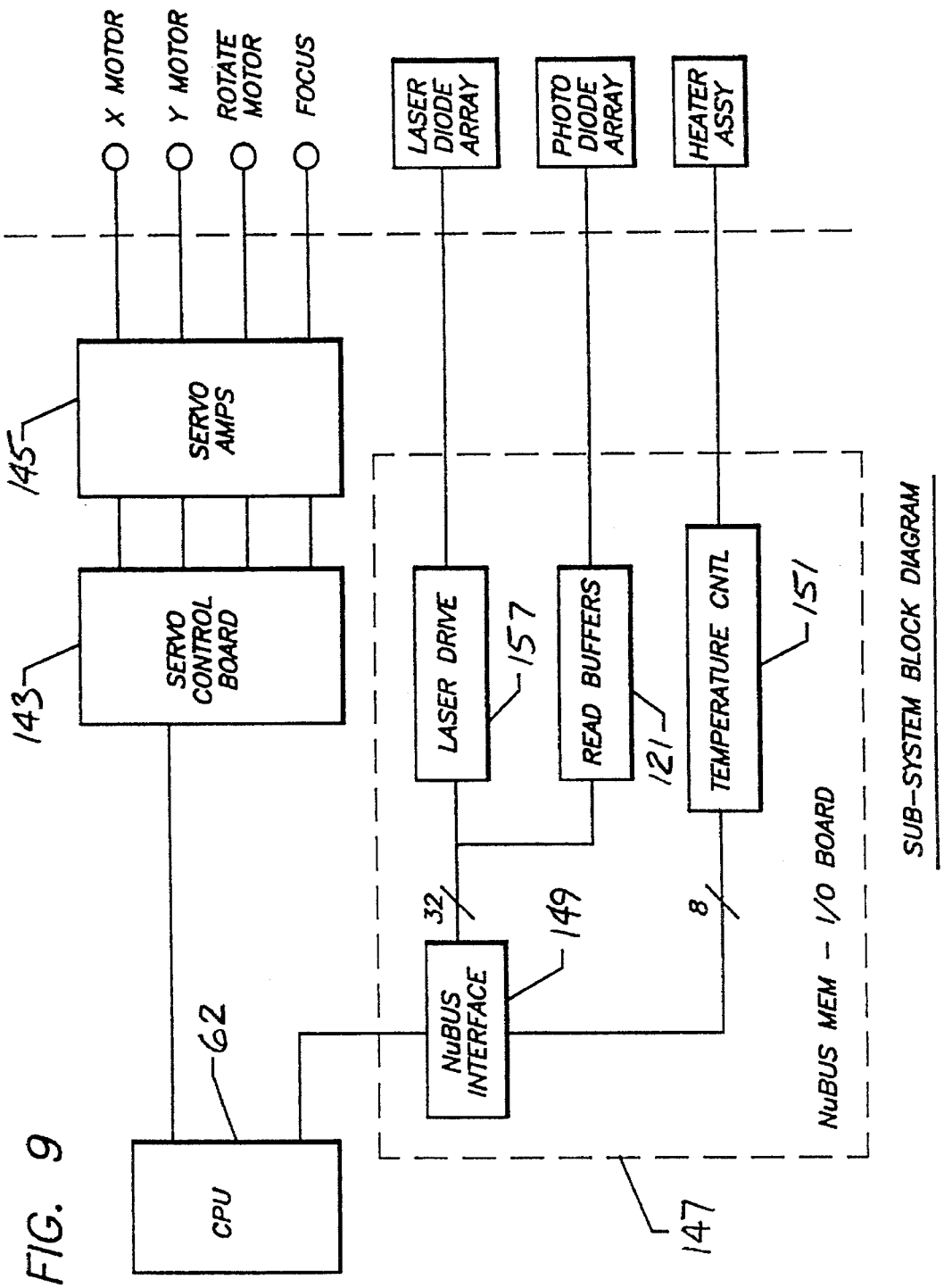
FIG. 9 is a detailed representation of a portion of the block diagram of FIG. 7, including the details of an input/output circuit board.

The sub-system block diagram of FIG. 9 shows further details of a portion of system block diagram of FIG. 7. The CPU 62 may, for example, be a Macintosh Quadra with the SCSI 60 built in. The motor controls for the card 10 in the assembly 14 of FIG. 1 are controlled by a dedicated servo control board 143. Servo amplifiers 145 are driven by the servo control board 143 and the outputs of the servo amplifiers directly drive the X motor, Y motor, rotational motor and focus motor for the card 10 in the assembly 14 of FIG. 1.

A NuBus interface board 147 is controlled by the CPU 62 through NuBus interface 149, and it includes a laser drive 157 for the laser diode array of the optical head 16 of FIG. 1, and also read buffers 121 for the photo diode array of the optical head. The NuBus board also contains a temperature control 151 for the heater assembly of the system.

Figure 10B:
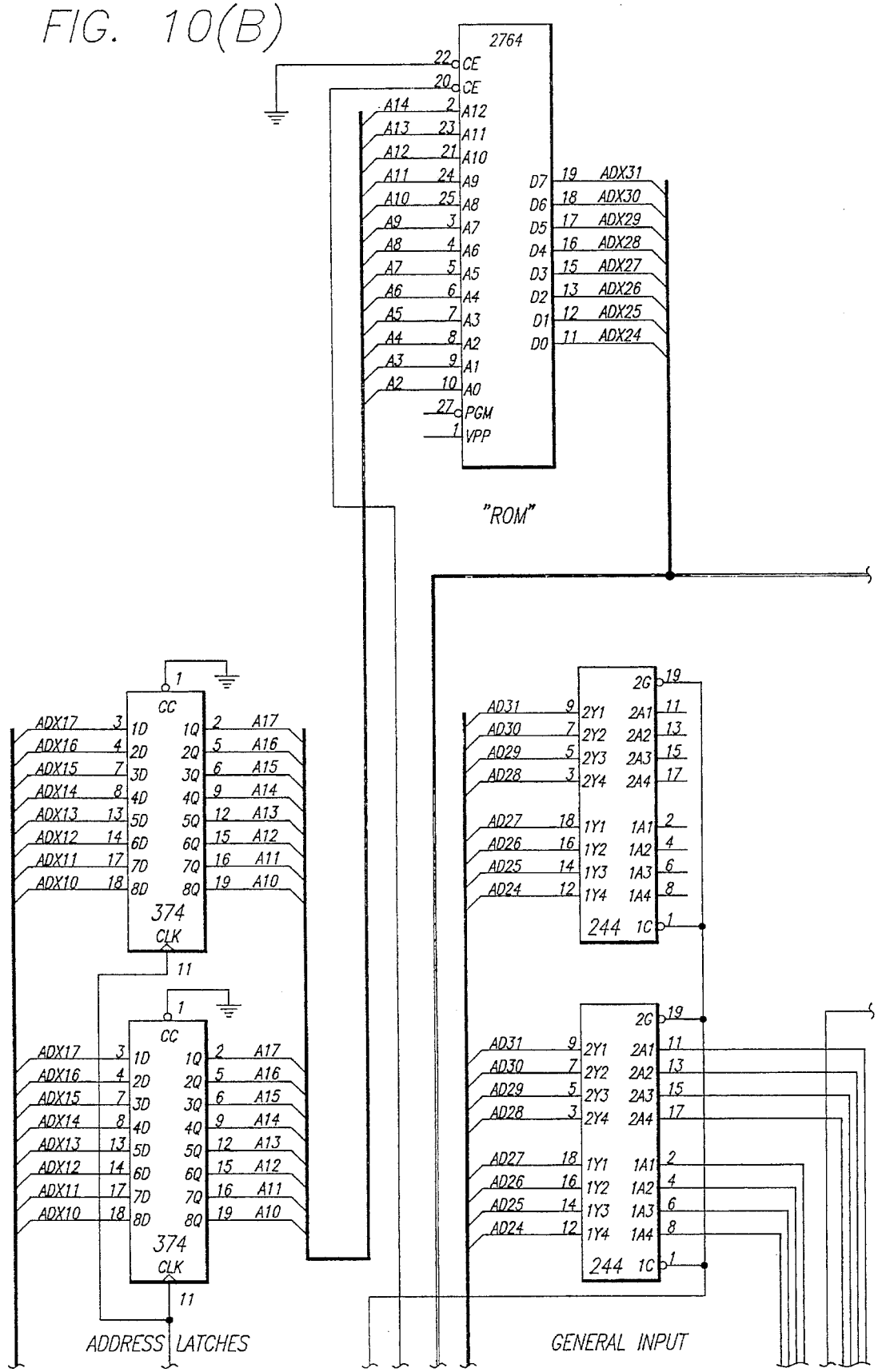
Figure 10:
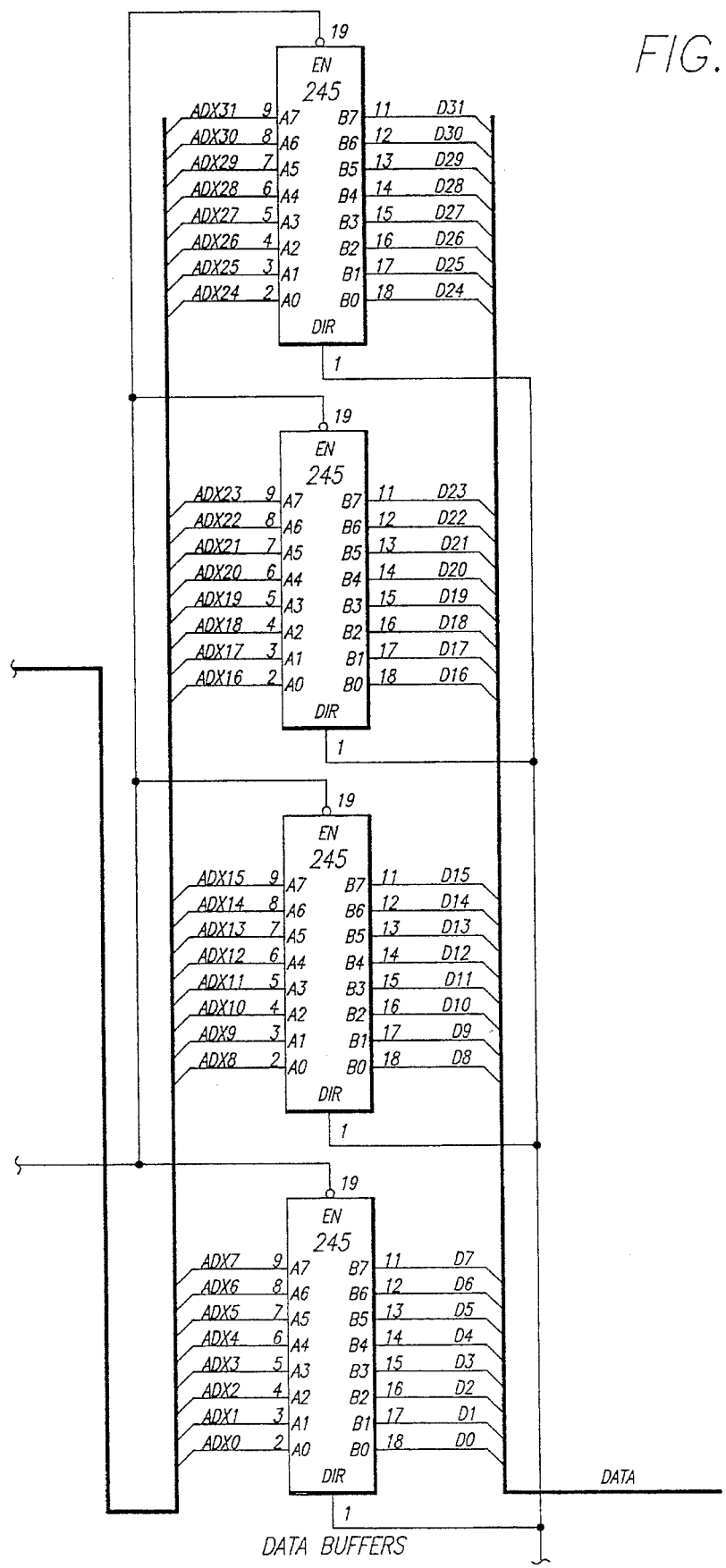
Figure 10D:
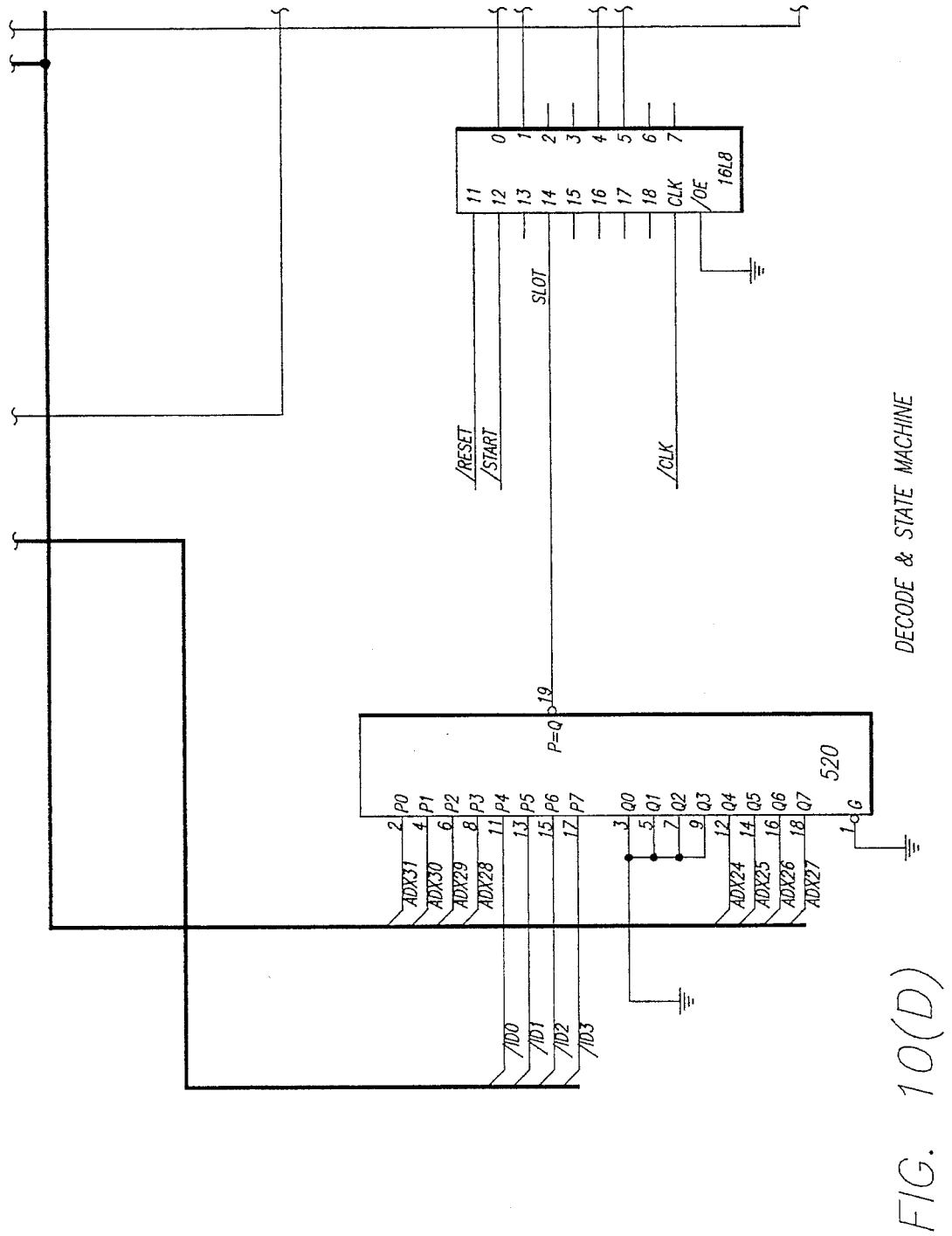

The electric circuits of FIGS. 10A–10E illustrate a detailed implementation of the NuBus MEM-I/O board 104 of FIG. 9 and FIG. 10F is a diagram showing the manner in which FIGS. 10A–10E should be mutually positioned in order to properly represent the circuitboard. The NuBus memory I/O board 104 of FIG. 9 consists of NuBus decoding, a state machine to implement NuBus timing, necessary latches and buffers to the bus, memory for buffering data, a ROM for NuBus initialization, which is really a RAM, (for debugging purposes), and I/O for interface to heater and temperature probe. The NuBus is a synchronous 10 MHz bus that is multiplexed. The NuBus interface circuitry implements a state machine that demultiplexes the bus and provides latched addresses to the ROM and to decoding circuits that control I/O. There are also buffers that are placed between various data inputs and outputs including the ROM, laser output latches, photo diode input and temperature controls.

The multi-axis servo control board 100 of FIG. 9 may be manufactured by Delta Tau and acts as a servo controller. It has a Motorolla 56000 digital signal processor (DSP). This board controls all motors simultaneously with feedback from two sources. The first feedback is from encoders on the motors to provide a quick but rough indication of position. This allows the servo system quickly to settle closely to the ideal position. Secondly, there are also servo marks on the media, as mentioned above, which are sensed by photo diodes on the laser head that send information indicating where the storage card really is with respect to the laser head. This dual system provides quick and accurate seeking.

The servo control board 100 has analog outputs which will serve the servo amplifiers 102. These in turn drive the motors for X and Y scanning movements of the card, for rotating the card, and for focusing. The servo control board 100 has analog outputs which drive the servo amplifiers of block 102, and which are discrete modules.

Figure 11:
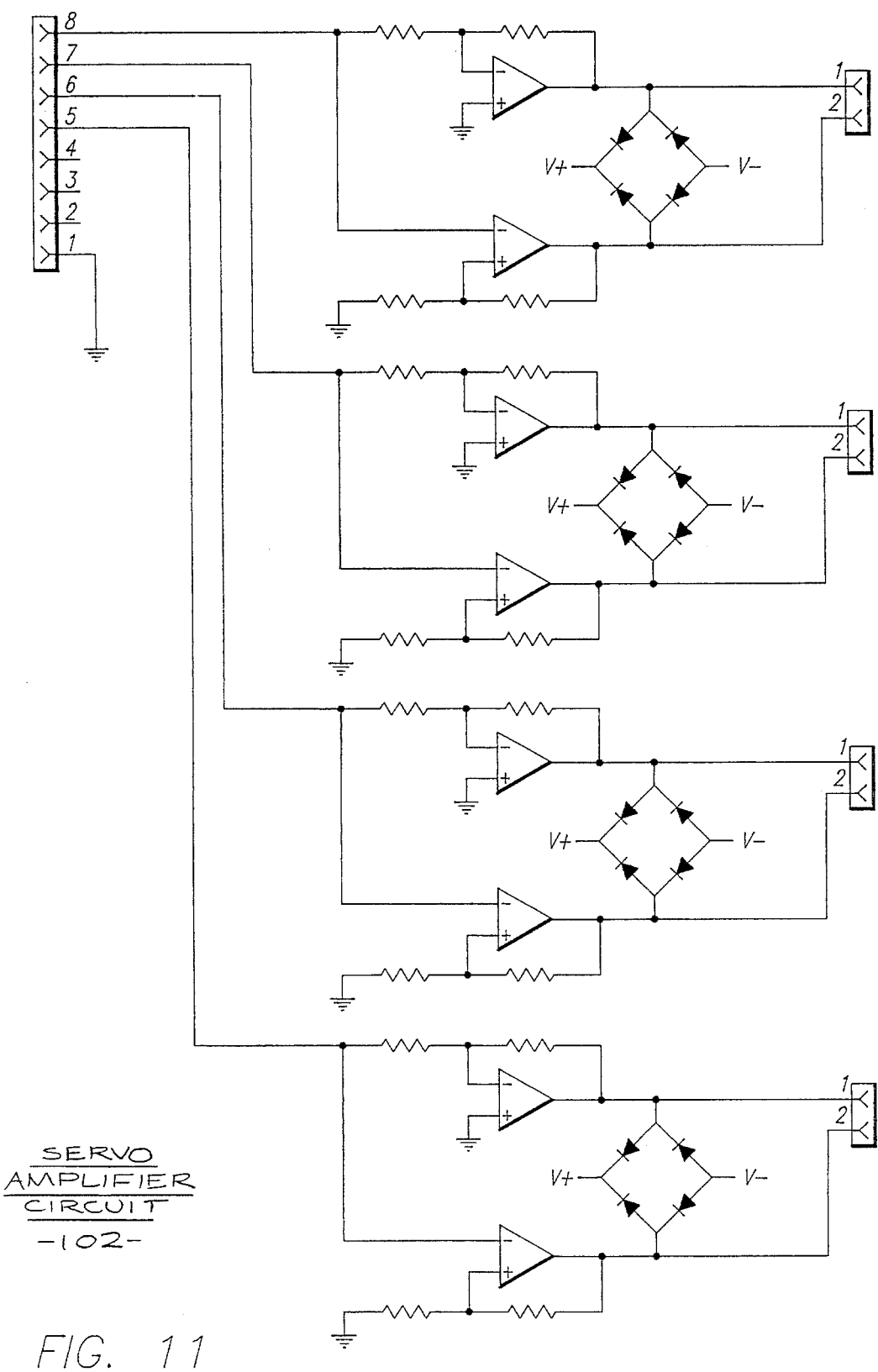
FIG. 11 is a circuit diagram of a servo amplifier for one of the block components shown in FIG. 7.

The servo amplifier circuit of block 102 is shown in circuit detail in FIG. 11. The circuit consists of operational amplifiers configured in a bridge configuration in order to drive the motors forward or backward. The amplifiers are power-up amplifiers in order to supply the relatively high power that the motors require. For short access time.

Figure 12A:
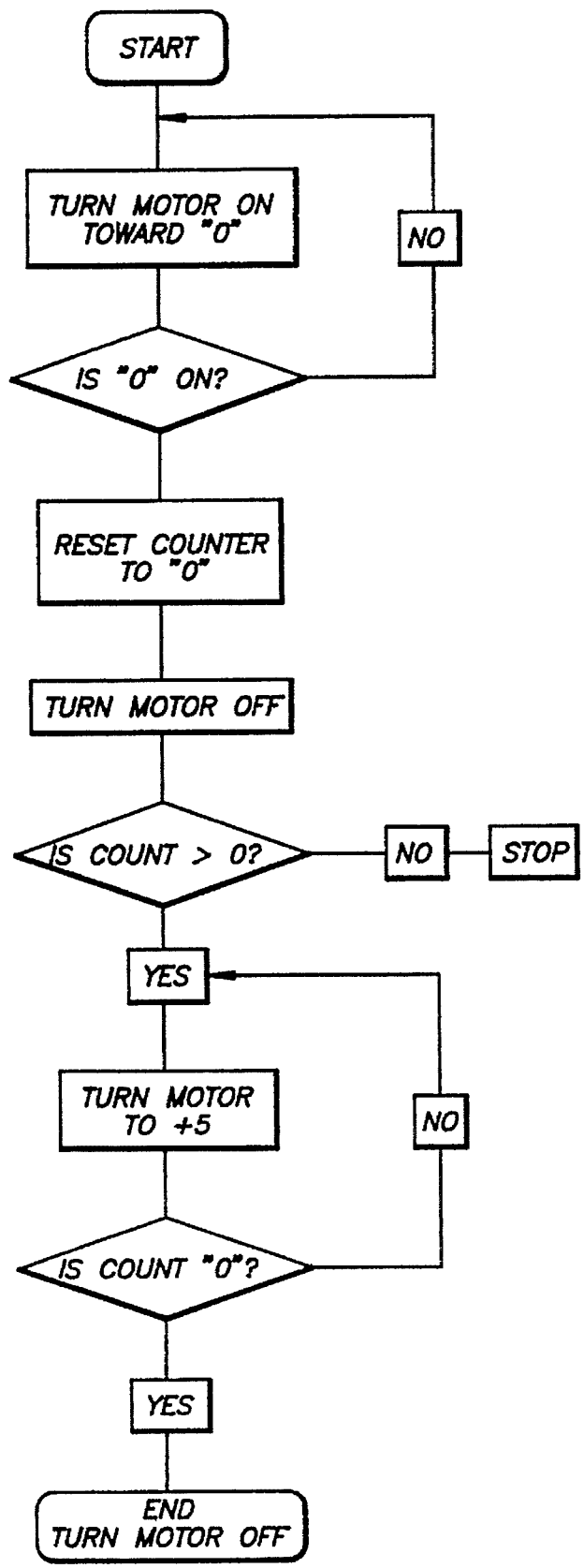
FIGS. 12A, 12B and 12C are software flow charts.
Figure 12B:
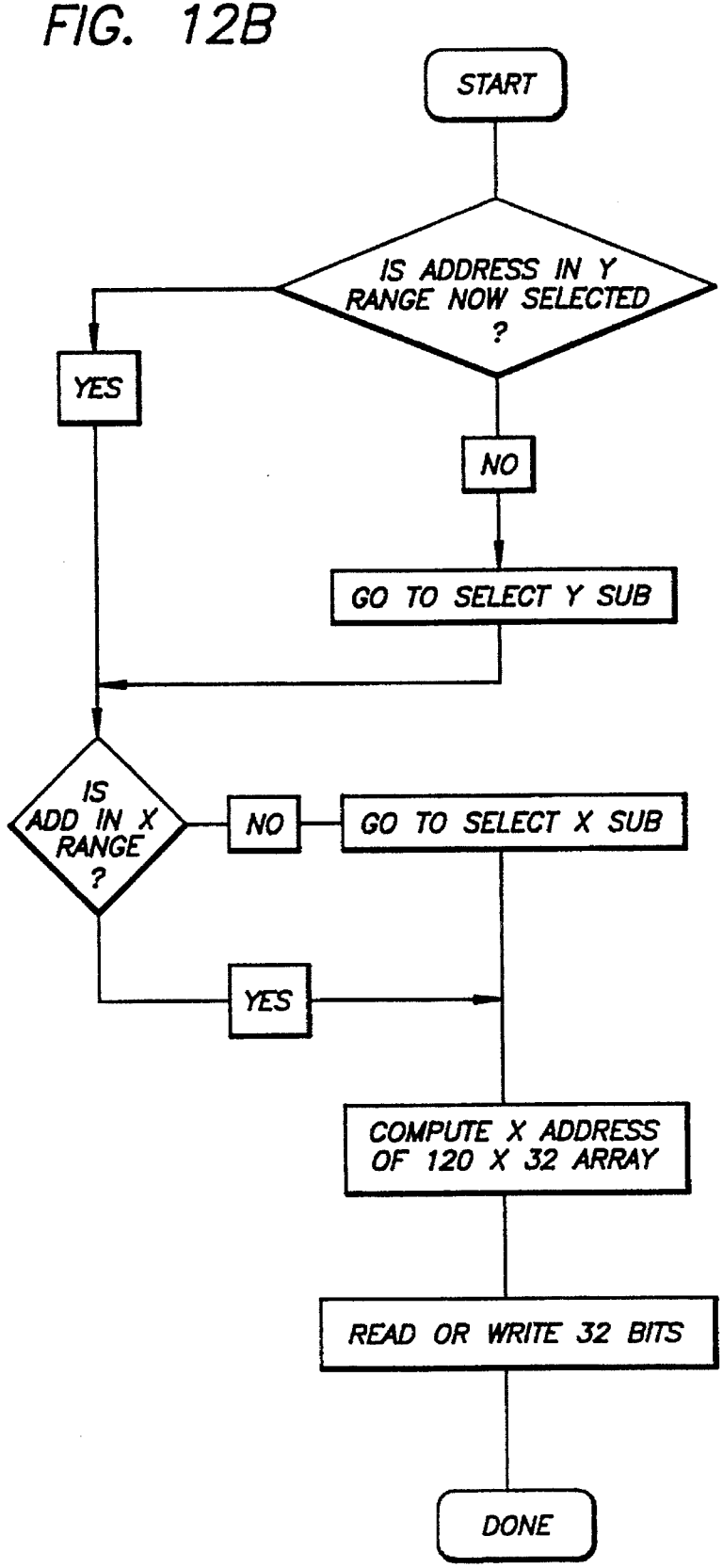
Figure 12C:
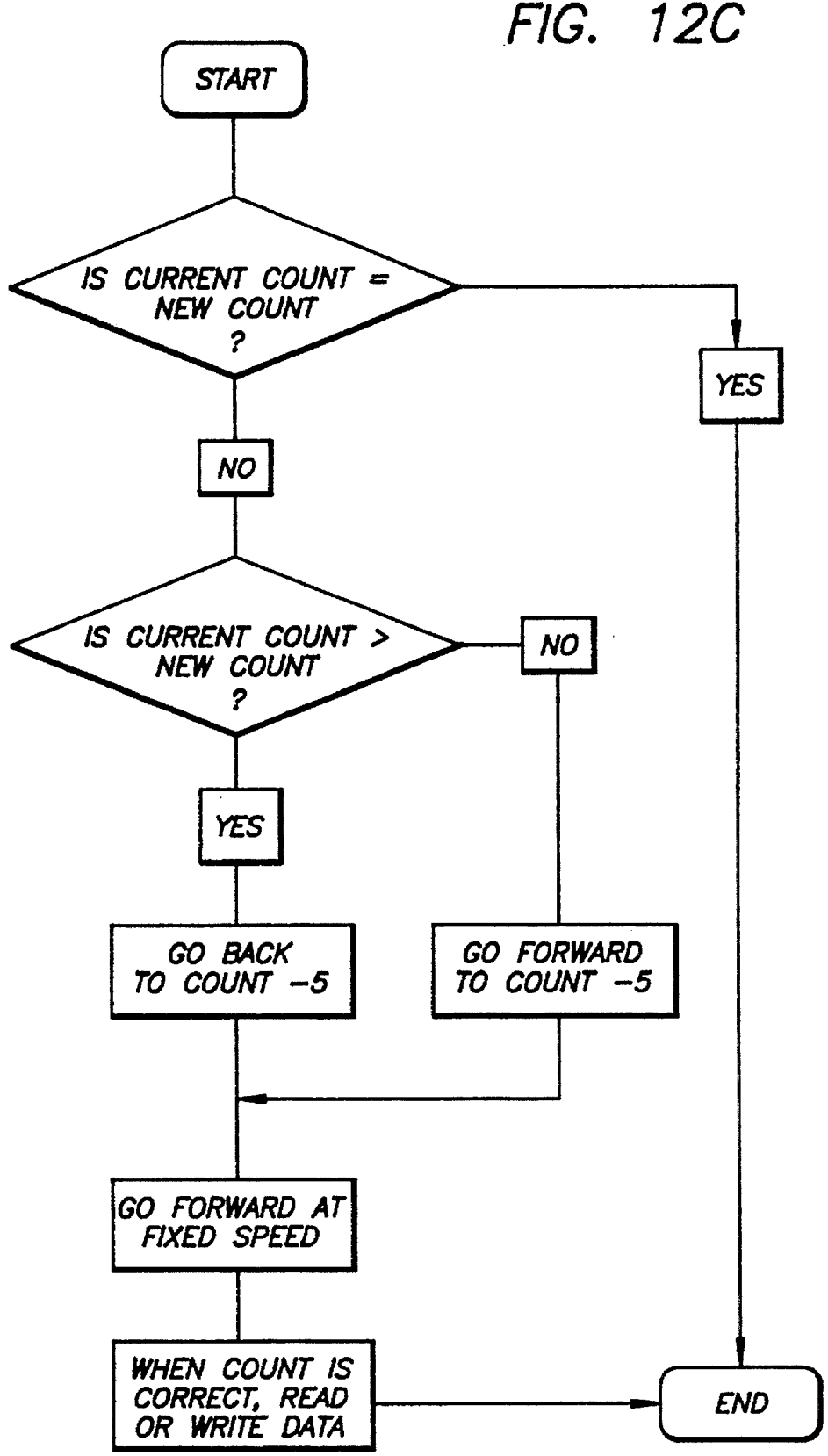

The software flow chart is shown in FIGS. 12A, 12B and 12C.

The invention provides, therefore, apparatus consisting of a flat, two-dimensional array of laser/photo diodes; an optical storage card positioned below the array; and a mechanism to move the card in both the X and Y directions in order to position the laser/photo diode array over any one particular location on the card (for example, one out of 1,000,000). A further mechanism is provided to move the card in the X- and Y-directions, and angularly in order to provide an initial alignment of the card with respect to the laser/photo diode array. Yet another mechanism is provided to move the card in the Z-direction for focusing purposes. A laser/optical interface is provided between the laser/photo diode array and the storage card. This interface is formed of arrays of collimating and focusing holographic micro lenses, each with a single surface diffraction pattern (HOE). An electronic section is also provided to function as an interface between a central processing unit (CPU) and the laser and photo diodes of the array. The optical storage card is preferably a thin, re-writable phase-change type.

While a particular embodiment of the invention has been shown and described, modifications may be made. It is intended in the following claims to cover all modifications which come within the true spirit and scope of the invention.

I claim:

1. Digital data recording and playback apparatus comprising: a flat, two-dimensional array of laser/photo diodes; support means for positioning an optical storage card below the array; a first mechanism engaging said support means for moving the card in both the X- and Y-directions to align the card with the laser/photo diode array and subsequently to position the laser/photo diode array over any one particular location on the card; a second mechanism engaging said support means to turn the card to a particular angular position with respect to the laser/photo diode array for aligning purposes; a third mechanism engaging said support means for moving the card in the Z-direction with respect to said laser/photo diode array for focusing purposes; and electronic circuitry connected to said array for processing electric signals generated from and introduced to said array.

2. The digital data recording and playback apparatus defined in claim 1, in which said support means is in the form of a flat, rigid platen.

3. The digital data recording and playback apparatus defined in claim 2, and which includes electric servo motor means included in said first mechanism and engaging said platen for controlling the movements of the card in the X- and Y-directions; and electric servo motor means included in said third mechanism and engaging said platen for controlling movements of the card in the Z-direction.

4. The digital data recording and playback apparatus defined in claim 3, and which includes a voice coil included in said second mechanism and engaging said platen for controlling the angular movements of the card.

5. The digital data recording and playback apparatus defined in claim 3, in which said servo motor means included in said third mechanism includes a servo motor, four screws positioned over said platen to engage said platen at the respective corners thereof, and drive means coupling said last named servo motor to said screws; and four spring-loaded flexure members positioned under said platen in axial alignment with respective ones of said screws for biasing said platen against said screws for focusing the card.

6. The digital data recording and playback apparatus defined in claim 3, and which includes flexure means included in said first mechanism for biasing said platen against said electric servo motor means.

7. The digital data recording and playback apparatus defined in claim 2, and which includes an electromagnet mounted on the underside of said platen for holding the storage card flat on said platen.

8. The digital data recording and playback apparatus defined in claim 2, in which the optical storage card is a thin, re-writable phase-change type.

9. The digital data recording and playback apparatus defined in claim 8, in which said optical storage card is formed of a plurality of coated or laminated layers of material, the card having a coefficient of expansion selected to match the coefficient of expansion of other cards as a primary requirement, and optical head components as a secondary requirement.

10. The digital data recording and playback apparatus defined in claim 9, in which said optical storage card is formed on an Invar substrate.

11. The optical storage card defined in claim 10, in which the layers formed on said substrate include deposits for thermal dispersion, reflection, a dielectric layer, an active layer, and a protective layer.

12. The optical storage card defined in claim 11, in which said protective layer is formed of clear Mylar, said dielectric layer is formed of CnS—Sio2, said active layer is formed of GeTe—Sb2Te3—Sb, and the reflection layer is formed of an aluminum alloy.

13. The digital data recording and playback apparatus defined in claim 1, and which includes a laser/optical interface positioned between said laser/optical diode array and said optical storage card for collimating and focusing laser beams from said array onto the surface of said storage card.

14. The digital data recording and playback apparatus defined in claim 1, in which said electronic circuitry includes multiplexing circuitry for multiplexing the signals applied to and derived from the laser/photo diode array.

* * * * *